United States Patent
Zhamu et al.

(10) Patent No.: US 10,903,020 B2
(45) Date of Patent: Jan. 26, 2021

(54) ROLLED SUPERCAPACITOR AND PRODUCTION PROCESS

(71) Applicant: Nanotek Instruments, Inc., Dayton, OH (US)

(72) Inventors: Aruna Zhamu, Springboro, OH (US); Chueh Liu, Dayton, OH (US); Song-Hai Chai, Centerville, OH (US); Bor Z. Jang, Centerville, OH (US)

(73) Assignee: Nanotek Instruments Group, LLC, Dayton, OH (US)

( * ) Notice: Subject to any disclaimer, the term of this patent is extended or adjusted under 35 U.S.C. 154(b) by 0 days.

(21) Appl. No.: 15/591,483

(22) Filed: May 10, 2017

(65) Prior Publication Data

US 2018/0330893 A1    Nov. 15, 2018

(51) Int. Cl.

| | |
|---|---|
| *H01G 11/06* | (2013.01) |
| *H01G 11/10* | (2013.01) |
| *H01G 11/24* | (2013.01) |
| *H01G 11/26* | (2013.01) |
| *H01G 11/28* | (2013.01) |
| *H01G 11/32* | (2013.01) |
| *H01G 11/48* | (2013.01) |
| *H01G 11/52* | (2013.01) |
| *H01G 11/84* | (2013.01) |

(Continued)

(52) U.S. Cl.
CPC ............ *H01G 11/32* (2013.01); *H01G 11/10* (2013.01); *H01G 11/26* (2013.01); *H01G 11/28* (2013.01); *H01G 11/36* (2013.01); *H01G 11/38* (2013.01); *H01G 11/82* (2013.01); *H01G 11/84* (2013.01); *H01G 11/24* (2013.01); *H01G 11/48* (2013.01)

(58) Field of Classification Search
CPC ........ H01G 11/32; H01G 11/26; H01G 11/46; H01G 11/06; H01G 11/10; H01G 11/22; H01G 11/24; H01G 11/28; H01G 11/48; H01G 11/84; H01G 11/86; H01G 11/52
USPC ........ 361/502, 508, 516, 503, 504; 29/25.03
See application file for complete search history.

(56) References Cited

U.S. PATENT DOCUMENTS 4,880,508 A    11/1989  Aldissi et al.
5,109,070 A     4/1992  Epstein et al.
(Continued)

OTHER PUBLICATIONS

Bor Z. Jang and A. Zhamu, "Processing of Nano Graphene Platelets (NGPs) and NGP Nanocomposites: A Review," J. Materials Sci. 43 (2008) 5092-5101.

(Continued)

*Primary Examiner* — Arun Ramaswamy

(57) ABSTRACT

Provided is rolled supercapacitor comprising an anode, a cathode, a porous separator, and an electrolyte, wherein the anode contains a wound anode roll of an anode active material having an anode roll length, an anode roll width, and an anode roll thickness, wherein the anode active material contains isolated graphene sheets that are oriented substantially parallel to the plane defined by the anode roll length and the anode roll width; and/or the cathode contains a wound cathode roll of a cathode active material having a cathode roll length, a cathode roll width, and a cathode roll thickness, wherein the cathode active material contains isolated graphene sheets that are oriented substantially parallel to the plane defined by the cathode roll length and the cathode roll width; and wherein the anode roll width and/or the cathode roll width is substantially perpendicular to the separator.

30 Claims, 12 Drawing Sheets

(51) Int. Cl.
*H01G 11/36* (2013.01)
*H01G 11/38* (2013.01)
*H01G 11/82* (2013.01)

(56) References Cited

U.S. PATENT DOCUMENTS

| | | | |
|---|---|---|---|
| 7,071,258 B1 | 7/2006 | Jang et al. | |
| 7,623,340 B1 | 11/2009 | Song et al. | |
| 9,437,372 B1 | 9/2016 | Zhamu et al. | |
| 2004/0251880 A1 | 12/2004 | O'Brien | |
| 2005/0083021 A1 | 4/2005 | Mahon | |
| 2009/0059474 A1 | 3/2009 | Zhamu | |
| 2009/0061312 A1* | 3/2009 | Zhamu | H01G 11/34 429/217 |
| 2009/0092747 A1 | 4/2009 | Zhamu | |
| 2010/0021819 A1 | 1/2010 | Zhamu | |
| 2013/0224603 A1* | 8/2013 | Chen | B82Y 30/00 429/322 |
| 2014/0234680 A1 | 8/2014 | Yoon et al. | |
| 2015/0016022 A1* | 1/2015 | Lee | B32B 37/02 361/502 |
| 2015/0262755 A1* | 9/2015 | Guillet | H01G 11/10 361/328 |
| 2016/0043384 A1* | 2/2016 | Zhamu | H01M 4/133 429/231.4 |
| 2016/0247637 A1* | 8/2016 | Nansaka | H01G 11/74 |

OTHER PUBLICATIONS

Y. Xu, et al. "Self-Assembled Graphene Hydrogel via a One-Step Hydrothermal Process," ACS Nano 2010, 4, 4324-4330.
Zongping Chen, et al., "Three-dimensional flexible and conductive interconnected graphene networks grown by chemical vapour deposition," Nature Materials, 10 (Jun. 2011) 424-428.
B. G. Choi, et al., "3D Macroporous Graphene Frameworks for Supercapacitors with High Energy and Power Densities," ACS Nano, 6 (2012) 4020-4028.
F. Karlicky, et al. "Halogenated Graphenes: Rapidly Growing Family of Graphene Derivatives" ACS Nano, 2013, 7 (8), pp. 6434-6464.
PCT/US18/25109—International Search Report and Written Opinion dated Jun. 28, 2018—13 pages.
PCT/US18/43413 International Search Report and Written Opinion dated Oct. 11, 2018, 7 pages.
U.S. Appl. No. 15/589,629 Final Office Action dated Feb. 13, 2020, 25 pages.
U.S. Appl. No. 15/589,629 Nonfinal Office Action dated Jun. 24, 2020, 25 pages.
U.S. Appl. No. 15/589,629 Nonfinal Office Action dated Sep. 5, 2019, 22 pages.
U.S. Appl. No. 15/671,611 Nonfinal Office Action dated Jan. 25, 2019, 6 pages.
U.S. Appl. No. 15/817,942 Final Office Action dated Mar. 26, 2020, 26 pages.

* cited by examiner

ROLLED SUPERCAPACITOR AND PRODUCTION PROCESS

FIELD OF THE INVENTION

The present invention relates generally to the field of supercapacitor and, more particularly, to a graphene-based rolled electrode, a rolled supercapacitor containing such an electrode, and a process for producing same.

BACKGROUND OF THE INVENTION

Electrochemical capacitors (ECs), also known as ultracapacitors or supercapacitors, are being considered for use in hybrid electric vehicles (EVs) where they can supplement a battery used in an electric car to provide bursts of power needed for rapid acceleration, the biggest technical hurdle to making battery-powered cars commercially viable. A battery would still be used for cruising, but supercapacitors (with their ability to release energy much more quickly than batteries) would kick in whenever the car needs to accelerate for merging, passing, emergency maneuvers, and hill climbing. The supercapacitor must also store sufficient energy to provide an acceptable driving range. To be cost-, volume-, and weight-effective compared to additional battery capacity they must combine adequate energy densities (volumetric and gravimetric) and power densities (volumetric and gravimetric) with long cycle life, and meet cost targets as well.

ECs are also gaining acceptance in the electronics industry as system designers become familiar with their attributes and benefits. ECs were originally developed to provide large bursts of driving energy for orbital lasers. In complementary metal oxide semiconductor (CMOS) memory backup applications, for instance, a one-Farad EC having a volume of only one-half cubic inch can replace nickel-cadmium or lithium batteries and provide backup power for months. For a given applied voltage, the stored energy in an EC associated with a given charge is half that storable in a corresponding battery system for passage of the same charge. Nevertheless, ECs are extremely attractive power sources. Compared with batteries, they require no maintenance, offer much higher cycle-life, require a very simple charging circuit, experience no "memory effect," and are generally much safer. Physical rather than chemical energy storage is the key reason for their safe operation and extraordinarily high cycle-life. Perhaps most importantly, capacitors offer higher power density than batteries.

The high volumetric capacitance density of an EC relative to conventional capacitors (10 to 100 times greater than conventional capacitors) derives from using porous electrodes to create a large effective "plate area" and from storing energy in the diffuse double layer. This double layer, created naturally at a solid-electrolyte interface when voltage is imposed, has a thickness of only about 1 nm, thus forming an extremely small effective "plate separation." Such a supercapacitor is commonly referred to as an electric double layer capacitor (EDLC). The double layer capacitor is based on a high surface area electrode material, such as activated carbon, immersed in a liquid electrolyte. A polarized double layer is formed at electrode-electrolyte interfaces providing high capacitance. This implies that the specific capacitance of a supercapacitor is directly proportional to the specific surface area of the electrode material. This surface area must be accessible by electrolyte and the resulting interfacial zones must be sufficiently large to accommodate the so-called electric double-layer charges.

In some ECs, stored energy is further augmented by pseudo-capacitance effects, occurring again at the solid-electrolyte interface due to electrochemical phenomena such as the redox charge transfer. Such a supercapacitor is commonly referred to as a pseudo-capacitor or redox supercapacitor. A third type of supercapacitor is a lithium-ion capacitor that contains a pre-lithiated graphite anode, an EDLC cathode (e.g. typically based on activated carbon particles), and a lithium salt electrolyte.

However, there are several serious technical issues associated with current state-of-the-art supercapacitors:

(1) Experience with supercapacitors based on activated carbon electrodes shows that the experimentally measured capacitance is always much lower than the geometrical capacitance calculated from the measured surface area and the width of the dipole layer. For very high surface area activated carbons, typically only about 20-40 percent of the "theoretical" capacitance was observed. This disappointing performance is related to the presence of micro-pores (<2 nm, mostly <1 nm) and ascribed to inaccessibility of some pores by the electrolyte, wetting deficiencies, and/or the inability of a double layer to form successfully in pores in which the oppositely charged surfaces are less than about 1-2 nm apart. In activated carbons, depending on the source of the carbon and the heat treatment temperature, a surprising amount of surfaces can be in the form of such micro-pores that are not accessible to liquid electrolyte.

(2) Despite the high gravimetric capacitances at the electrode level (based on active material weights alone) as frequently claimed in open literature and patent documents, these electrodes unfortunately fail to provide energy storage devices with high capacities at the supercapacitor cell or pack level (based on the total cell weight or pack weight). This is due to the notion that, in these reports, the actual mass loadings of the electrodes and the apparent densities for the active materials are too low. In most cases, the active material mass loadings of the electrodes (areal density) is significantly lower than 10 mg/cm$^2$ (areal density=the amount of active materials per electrode cross-sectional area along the electrode thickness direction) and the apparent volume density or tap density of the active material is typically less than 0.75 g/cm$^{-3}$ (more typically less than 0.5 g/cm$^{-3}$ and most typically less than 0.3 g/cm$^{-3}$) even for relatively large particles of activated carbon.

The low mass loading is primarily due to the inability to obtain thicker electrodes (thicker than 150 μm) using the conventional slurry coating procedure. This is not a trivial task as one might think, and in reality the electrode thickness is not a design parameter that can be arbitrarily and freely varied for the purpose of optimizing the cell performance. Contrarily, thicker samples tend to become extremely brittle or of poor structural integrity and would also require the use of large amounts of binder resin. These problems are particularly acute for graphene material-based electrodes. It has not been previously possible to produce graphene-based electrodes that are thicker than 100 μm and remain highly porous with pores remaining fully accessible to liquid electrolyte. The low areal densities and low volume densities (related to thin electrodes and poor packing density) result in relatively low volumetric capacitances and low volumetric energy density of the supercapacitor cells.

With the growing demand for more compact and portable energy storage systems, there is keen interest to increase the utilization of the volume of the energy storage devices. Novel electrode materials and designs that enable high volumetric capacitances and high mass loadings are essential to achieving improved cell volumetric capacitances and energy densities.

(3) During the past decade, much work has been conducted to develop electrode materials with increased volumetric capacitances utilizing porous carbon-based materials, such as graphene, carbon nanotube-based composites, porous graphite oxide, and porous meso carbon. Although these experimental supercapacitors featuring such electrode materials can be charged and discharged at high rates and also exhibit large volumetric electrode capacitances (50 to 150 F/cm³ in most cases, based on the electrode volume), their typical active mass loading of <1 mg/cm², tap density of <0.2 g/cm⁻³, and electrode thicknesses of up to tens of micrometers (<<100 µm) are still significantly lower than those used in most commercially available electrochemical capacitors (i.e. 10 mg/cm², 100-200 µm), which results in energy storage devices with relatively low areal and volumetric capacitances and low volumetric energy densities.

(4) For graphene-based supercapacitors, there are additional problems that remain to be solved, explained below:

Nano graphene materials have recently been found to exhibit exceptionally high thermal conductivity, high electrical conductivity, and high strength. Another outstanding characteristic of graphene is its exceptionally high specific surface area. A single graphene sheet provides a specific external surface area of approximately 2,675 m²/g (that is accessible by liquid electrolyte), as opposed to the exterior surface area of approximately 1,300 m²/g provided by a corresponding single-wall CNT (interior surface not accessible by electrolyte). The electrical conductivity of graphene is slightly higher than that of CNTs.

The instant applicants (A. Zhamu and B. Z. Jang) and their colleagues were the first to investigate graphene- and other nano graphite-based nano materials for supercapacitor application [Please see Refs. 1-5 below; the 1$^{st}$ patent application was submitted in 2006 and issued in 2009]. After 2008, researchers began to realize the significance of graphene materials for supercapacitor applications.

LIST OF REFERENCES

1. Lulu Song, A. Zhamu, Jiusheng Guo, and B. Z. Jang "Nano-scaled Graphene Plate Nanocomposites for Supercapacitor Electrodes" U.S. Pat. No. 7,623,340 (Nov. 24, 2009).
2. Aruna Zhamu and Bor Z. Jang, "Process for Producing Nano-scaled Graphene Platelet Nanocomposite Electrodes for Supercapacitors," Patent Appl. US20090092747 (2009 Apr. 9).
3. Aruna Zhamu and Bor Z. Jang, "Graphite-Carbon Composite Electrodes for Supercapacitors" Pat. Appl. US20090059474 (2009 Mar. 5).
4. Aruna Zhamu and Bor Z. Jang, "Method of Producing Graphite-Carbon Composite Electrodes for Supercapacitors" Pat. Appl. US20090061312 (2009 Mar. 5).
5. Aruna Zhamu and Bor Z. Jang, "Graphene Nanocomposites for Electrochemical cell Electrodes," Patent Appl. US20100021819 (2010 Jan. 28).

However, individual nano graphene sheets have a great tendency to re-stack themselves, effectively reducing the specific surface areas that are accessible by the electrolyte in a supercapacitor electrode. The significance of this graphene sheet overlap issue may be illustrated as follows: For a nano graphene platelet with dimensions of l(length)×w (width)×t (thickness) and density ρ, the estimated surface area per unit mass is $S/m = (2/\rho)(1/l + 1/w + 1/t)$. With $\rho \approx 2.2$ g/cm³, l=100 nm, w=100 nm, and t=0.34 nm (single layer), we have an impressive S/m value of 2,675 m²/g, which is much greater than that of most commercially available carbon black or activated carbon materials used in the state-of-the-art supercapacitor. If two single-layer graphene sheets stack to form a double-layer graphene, the specific surface area is reduced to 1,345 m²/g. For a three-layer graphene, t=1 nm, we have S/m=906 m²/g. If more layers are stacked together, the specific surface area would be further significantly reduced.

These calculations suggest that it is critically important to find a way to prevent individual graphene sheets from re-stacking and, even if they partially re-stack, the resulting multi-layer structure would still have inter-layer pores of adequate sizes. These pores must be sufficiently large to allow for accessibility by the electrolyte and to enable the formation of electric double-layer charges, which presumably require a pore size of at least 1-2 nm. However, these pores or inter-graphene spacings must also be sufficiently small to ensure a large tap density (hence, large capacitance per unit volume or large volumetric energy density). Unfortunately, the typical tap density of graphene-based electrode produced by the conventional process is less than 0.3 g/cm³, and most typically <<0.2 g/cm³. To a great extent, the requirement to have large pore sizes and high porosity level and the requirement to have a high tap density are considered mutually exclusive in supercapacitors.

Another major technical barrier to using graphene sheets as a supercapacitor electrode active material is the challenge of forming a thick active material layer onto the surface of a solid current collector (e.g. Al foil) using the conventional graphene-solvent slurry coating process. In such an electrode, the graphene electrode typically requires a large amount of a binder resin (hence, significantly reduced active material proportion vs. non-active or overhead materials/components). In addition, any graphene electrode prepared in this manner that is thicker than 50 µm is brittle and weak. There has been no effective solution to these problems.

Therefore, there is clear and urgent need for supercapacitors that have high active material mass loading (high areal density), active materials with a high apparent density (high tap density), high electrode volume, high volumetric capacitance, and high volumetric energy density. For graphene-based electrodes, one must also overcome problems such as re-stacking of graphene sheets, the demand for large proportion of a binder resin, and difficulty in producing thick graphene electrode layers.

Our research group was among the first to discover graphene [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. The processes for producing NGPs and NGP nanocomposites were recently reviewed by us [Bor Z. Jang and A Zhamu, "Processing of Nano Graphene Platelets (NGPs) and NGP Nanocomposites: A Review," J. Materials Sci. 43 (2008) 5092-5101].

For the purpose of defining the claims of the instant application, graphene materials (or nano graphene platelets, NGPs) include discrete sheets/platelets of single-layer and multi-layer (typically less than 10 layers) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials.

Presumably, a graphene foam structure can be made to have a high thickness and thus is potentially a good supercapacitor electrode material. Generally speaking, a foam or foamed material is composed of pores (or cells) and pore walls (a solid material). The pores can be interconnected to form an open-cell foam. A graphene foam is composed of pores and pore walls that contain a graphene material. However, the use of a graphene foam structure is not without significant shortcomings. For instance, it is very difficult to impregnate liquid electrolyte into pores of a graphene foam structure even if it is an open-cell form (the impregnation of closed-cell foam, once made, by liquid electrode is impossible). These open cells (pores) must be very large in size and must be interconnected to allow for electrolyte entry. Unfortunately, this also implies a very low tap density and, hence, poor volumetric capacitance and energy density.

Additionally, the production of graphene-based foam structures has other problems as well, explained below. There are three major methods of producing graphene foams:

The first method is the hydrothermal reduction of graphene oxide hydrogel that typically involves sealing graphene oxide (GO) aqueous suspension in a high-pressure autoclave and heating the GO suspension under a high pressure (tens or hundreds of atm) at a temperature typically in the range of 180-300° C. for an extended period of time (typically 12-36 hours). A useful reference for this method is given here: Y. Xu, et al. "Self-Assembled Graphene Hydrogel via a One-Step Hydrothermal Process," ACS Nano 2010, 4, 4324-4330. There are several major issues associated with this method: (a) The high pressure requirement makes it an impractical method for industrial-scale production. For one thing, this process cannot be conducted on a continuous basis. (b) It is difficult, if not impossible, to exercise control over the pore size and the porosity level of the resulting porous structure. (c) There is no flexibility in terms of varying the shape and size of the resulting reduced graphene oxide (RGO) material (e.g. it cannot be made into a film shape). (d) The method involves the use of an ultra-low concentration of GO suspended in water (e.g. 2 mg/mL=2 g/L=2 kg/kL). With the removal of non-carbon elements (up to 50%), one can only produce less than 2 kg of graphene material (RGO) per 1000-liter suspension. Furthermore, it is practically impossible to operate a 1000-liter reactor that has to withstand the conditions of a high temperature and a high pressure. Clearly, this is not a scalable process for mass production of porous graphene structures.

The second method is based on a template-assisted catalytic CVD process, which involves CVD deposition of graphene on a sacrificial template (e.g. Ni foam). The graphene material conforms to the shape and dimensions of the Ni foam structure. The Ni foam is then etched away using an etching agent, leaving behind a monolith of graphene skeleton that is essentially an open-cell foam. A useful reference for this method is given here: Zongping Chen, et al., "Three-dimensional flexible and conductive interconnected graphene networks grown by chemical vapour deposition," Nature Materials, 10 (June 2011) 424-428. There are several problems associated with such a process: (a) the catalytic CVD is intrinsically a very slow, highly energy-intensive, and expensive process; (b) the etching agent is typically a highly undesirable chemical and the resulting Ni-containing etching solution is a source of pollution. It is very difficult and expensive to recover or recycle the dissolved Ni metal from the etchant solution. (c) It is challenging to maintain the shape and dimensions of the graphene foam without damaging the cell walls when the Ni foam is being etched away. The resulting graphene foam is typically very brittle and fragile. (d) The transport of the CVD precursor gas (e.g. hydrocarbon) into the interior of a metal foam can be difficult, resulting in a non-uniform structure, since certain spots inside the sacrificial metal foam may not be accessible to the CVD precursor gas.

The third method of producing graphene foam also makes use of a sacrificial material (e.g. colloidal polystyrene particles, PS) that is coated with graphene oxide sheets using a self-assembly approach. For instance, Choi, et al. prepared chemically modified graphene (CMG) paper in two steps: fabrication of free-standing PS/CMG films by vacuum filtration of a mixed aqueous colloidal suspension of CMG and PS (2.0 μm PS spheres), followed by removal of PS beads to generate 3D macro-pores. [B. G. Choi, et al., "3D Macroporous Graphene Frameworks for Supercapacitors with High Energy and Power Densities," ACS Nano, 6 (2012) 4020-4028.] Choi, et al. fabricated well-ordered free-standing PS/CMG paper by filtration, which began with separately preparing a negatively charged CMG colloidal and a positively charged PS suspension. A mixture of CMG colloidal and PS suspension was dispersed in solution under controlled pH (=2), where the two compounds had the same surface charges (zeta potential values of +13±2.4 mV for CMG and +68±5.6 mV for PS). When the pH was raised to 6, CMGs (zeta potential=−29±3.7 mV) and PS spheres (zeta potential=+51±2.5 mV) were assembled due to the electrostatic interactions and hydrophobic characteristics between them, and these were subsequently integrated into PS/CMG composite paper through a filtering process. This method also has several shortcomings: (a) This method requires very tedious chemical treatments of both graphene oxide and PS particles. (b) The removal of PS by toluene also leads to weakened macro-porous structures. (c) Toluene is a highly regulated chemical and must be treated with extreme caution. (d) The pore sizes are typically excessively big (e.g. several μm), too big for many useful applications.

The above discussion clearly indicates that every prior art method or process for producing graphene electrodes having a high specific surface area (e.g. a graphene foam structure) has major deficiencies. Thus, it is an object of the present invention to provide a cost-effective process for mass-producing highly conductive, mechanically robust graphene-based electrodes that do not have these common issues of conventional graphene foam-based electrodes. This process must also enable the flexible design and control of the porosity level and pore sizes. Specifically, this process enables the production of a graphene-based electrodes that overcome the issues of graphene re-stacking, low tap density, low achievable electrode thickness, low achievable active material mass loading, low specific capacitance (per unit weight or volume), and low gravimetric and volumetric energy densities.

Another object of the present invention is to provide a supercapacitor containing a graphene-based electrode that has a high electrode volume, high tap density, high active material mass loading, little or no graphene re-stacking, high specific capacitance, and high energy densities.

SUMMARY OF THE INVENTION

The present invention provides a rolled supercapacitor that meets all of the above requirements. The rolled supercapacitor comprises an anode, a cathode, a porous separator electronically separating the anode and the cathode, and an electrolyte in ionic contact with the anode and the cathode, wherein the anode contains a wound anode roll of an anode active material having an anode roll length, an anode roll width, and an anode roll thickness, wherein the anode active material contains isolated graphene sheets that are oriented substantially parallel to the plane defined by the anode roll length and the anode roll width; and/or the cathode contains a wound cathode roll of a cathode active material having a cathode roll length, a cathode roll width, and a cathode roll thickness, wherein the cathode active material contains isolated graphene sheets that are oriented substantially parallel to the plane defined by the cathode roll length and the cathode roll width; and wherein the anode roll width and/or the cathode roll width is substantially perpendicular to the separator plane.

In certain embodiments, the isolated graphene sheets are selected from a pristine graphene or a non-pristine graphene material, having a content of non-carbon elements greater than 2% by weight, selected from graphene oxide, reduced graphene oxide, graphene fluoride, graphene chloride, graphene bromide, graphene iodide, hydrogenated graphene, nitrogenated graphene, chemically functionalized graphene, doped graphene, or a combination thereof.

To form a pseudo-capacitor, the isolated graphene sheets may be attached to or coupled with a nano-scaled coating or particles of a redox pair partner selected from an intrinsically conductive polymer, a transition metal oxide, and/or an organic molecule, wherein the redox pair partner and said graphene sheets form a redox pair for pseudo-capacitance. The intrinsically conducting polymer may be selected from polyaniline, polypyrrole, polythiophene, polyfuran, sulfonated polyaniline, sulfonated polypyrrole, sulfonated polythiophene, sulfonated polyfuran, sulfonated polyacetylene, or a combination thereof.

The liquid or gel electrolyte contains an aqueous electrolyte, an organic electrolyte, an ionic liquid electrolyte, or a mixture of an organic and an ionic electrolyte. There is no particular limitation on the type of electrolyte that can be used. Any electrolyte used in prior art supercapacitors can be implemented for use in the instant rolled supercapacitor.

Typically, the rolled supercapacitor further contains an anode tab connected to or integral with the anode and a cathode tab connected to or integral with the cathode. Preferably and typically, the rolled supercapacitor further comprises a casing that encloses the anode, the cathode, the separator, and the electrolyte therein to form a sealed battery.

In certain embodiments, in the rolled supercapacitor (herein referred to as Type-I rolled supercapacitor), the wound anode roll of an anode active material contains (a) a layer of supporting solid substrate having two primary surfaces wherein either one or both of the primary surfaces are coated with the anode active material, an optional conductive additive, and an optional binder or (b) a layer of supporting porous substrate having pores that are impregnated with the anode active material, an optional conductive additive, and an optional binder. In certain embodiments, the wound cathode roll of a cathode active material contains (a) a layer of supporting solid substrate having two primary surfaces wherein either one or both of the primary surfaces are coated with the cathode active material, an optional conductive additive, and an optional binder or (b) a layer of supporting porous substrate having pores that are impregnated with the cathode active material, an optional conductive additive, and an optional binder.

In certain preferred embodiments, the electrolyte and the isolated graphene sheets in the anode or the cathode of the invented rolled supercapacitor are assembled into an electrolyte-impregnated laminar graphene structure that is wound into an anode roll or a cathode roll, wherein the isolated graphene sheets are alternately spaced by thin electrolyte layers, having a thickness from 0.4 nm to 10 nm, and the laminar graphene structure has a physical density from 0.5 to 1.7 g/cm$^3$ and a specific surface area from 50 to 3,300 m$^2$/g, when measured in a dried state of the laminar structure with said electrolyte removed.

Thus, a particularly desirable embodiment of the present invention is a rolled supercapacitor (Type-II rolled supercapacitor) comprising an anode current collector, an anode, a cathode, a cathode current collector, an ion-permeable separator that electronically separates the anode and the cathode, and an electrolyte in ionic contact with the anode and the cathode, wherein the anode and/or the cathode contains a wound roll of an electrolyte-impregnated laminar graphene structure, which is composed of multiple graphene sheets being alternately spaced by thin electrolyte layers, less than 5 nm in thickness (typically from 0.3 nm to 5 nm), and the multiple graphene sheets are substantially aligned along a desired direction perpendicular to the separator, and wherein the laminar graphene structure has a physical density from 0.5 to 1.7 g/cm$^3$ and a specific surface area from 50 to 3,300 m$^2$/g, when measured in a dried state of the laminar graphene structure with the electrolyte removed.

The invention also provides an electrode roll (or rolled electrode) for use in an anode or a cathode of a supercapacitor. The electrode roll (an anode roll or cathode roll) has a roll length, roll width, and roll thickness and contains an electrolyte-impregnated laminar graphene structure, which is composed of multiple graphene sheets being alternately spaced by thin electrolyte layers, from 0.3 nm to 10 nm in thickness, wherein multiple graphene sheets are substantially aligned along a desired direction parallel to the roll length and the roll width and perpendicular to the roll thickness, and wherein the laminar graphene structure has a physical density from 0.5 to 1.7 g/cm$^3$ and a specific surface area from 50 to 3,300 m$^2$/g, when measured in a dried state of the laminar graphene structure with the electrolyte removed.

The rolled supercapacitor (either Type-I or Type-II) may be an electric double layer capacitor (EDLC), a pseudo or redox supercapacitor, a lithium-ion capacitor (LIC), or a sodium-ion capacitor. In one example, the supercapacitor is a lithium-ion capacitor or sodium-ion capacitor, wherein the cathode contains a wound cathode roll of a cathode active material having isolated graphene sheets that are oriented substantially parallel to the plane defined by the cathode roll length and the cathode roll width; and the anode contains a pre-lithiated anode active material or a pre-sodiated anode active material. Preferably, the anode contains a roll of a layer or two layers of a pre-lithiated anode active material or pre-sodiated anode active material layer coated on a solid or porous supporting substrate.

In certain embodiments, the rolled supercapacitor is a lithium-ion capacitor or sodium-ion capacitor, wherein the cathode contains a wound cathode roll of a cathode active material having isolated graphene sheets that are oriented substantially parallel to the plane defined by the cathode roll length and the cathode roll width; and the anode contains a pre-lithiated anode active material or a pre-sodiated anode active material. Preferably, the anode contains a roll of a layer or two layers of a pre-lithiated anode active material or pre-sodiated anode active material layer coated on a solid or porous supporting substrate.

Additionally, the invention provides a supercapacitor that contains a plurality of the presently invented rolled supercapacitors that are internally connected in series. The invention also provides a supercapacitor that contains a plurality of the presently invented rolled supercapacitors that are internally connected in parallel.

The invention also provides a process for producing a Type-I rolled supercapacitor. The process comprises:
(a) preparing an anode roll by rolling or winding a layer of solid or porous supporting substrate coated or impregnated with an anode active material, an optional conductive additive, and an optional binder into a roll shape;
(b) preparing a cathode roll by rolling or winding a layer of solid or porous supporting substrate coated or impregnated with a cathode active material, an optional conductive additive, and an optional binder into a roll shape; wherein at least the anode roll or the cathode roll contains isolated graphene sheets that are oriented perpendicular to the anode roll thickness or cathode roll thickness;
(c) aligning and packing the anode roll, the cathode roll, and an ion-conducting separator layer between the anode roll and the cathode roll to form a supercapacitor assembly in such a manner that the anode roll width and/or the cathode roll width direction is substantially perpendicular to the separator plane; and
(d) impregnating an electrolyte into the battery assembly before or after the supercapacitor assembly is inserted into a protective casing to form the rolled supercapacitor.

Another embodiment of the instant invention is a process for producing the rolled supercapacitor (e.g. a lithium-ion capacitor or sodium-ion capacitor). The process comprises: (a) preparing an anode containing an anode active material, an optional conductive additive, and an optional binder (not necessarily in a roll shape); (b) preparing a cathode roll by rolling or winding a layer of solid or porous supporting substrate coated or impregnated with a cathode active material, an optional conductive additive, and an optional binder into a roll shape, wherein the cathode active material contains isolated graphene sheets that are oriented substantially parallel to the plane defined by the cathode roll length and the cathode roll width (the layer or roll has a length and a width that together define a plane); (c) aligning and packing the anode, the cathode roll, and an ion-conducting separator layer between the anode and the cathode roll to form a supercapacitor assembly in such a manner that the cathode roll width direction is substantially perpendicular to the separator plane; and (d) impregnating an electrolyte into the supercapacitor assembly before or after the supercapacitor assembly is inserted into a protective casing to form the rolled supercapacitor.

Preferably, the porous supporting substrate contains an electrically conductive porous layer selected from metal foam, metal web or screen, perforated metal sheet-based structure, metal fiber mat, metal nanowire mat, conductive polymer nano-fiber mat, conductive polymer foam, conductive polymer-coated fiber foam, carbon foam, graphite foam, carbon aerogel, carbon xerogel, graphene foam, graphene oxide foam, reduced graphene oxide foam, carbon fiber foam, graphite fiber foam, exfoliated graphite foam, or a combination thereof Another preferred embodiment is a process for producing the Type-II rolled supercapacitor. The process comprises: (a) preparing an anode roll by winding a layer of electrolyte-impregnated laminar graphene structure into a roll shape having an anode roll length, anode roll width, and anode roll thickness, wherein the electrolyte-impregnated laminar graphene structure is composed of multiple graphene sheets being alternately spaced by thin electrolyte layers, from 0.3 nm to 10 nm in thickness, wherein the multiple graphene sheets are substantially aligned along a desired direction parallel to the anode roll length and anode roll width and perpendicular to the anode roll thickness, and wherein the laminar graphene structure has a physical density from 0.5 to 1.7 $g/cm^3$ and a specific surface area from 50 to 3,300 $m^2/g$, when measured in a dried state of the laminar graphene structure with the electrolyte removed; (b) preparing a cathode roll by winding a layer of electrolyte-impregnated laminar graphene structure into a roll shape having a cathode roll length, cathode roll width, and cathode roll thickness, wherein the electrolyte-impregnated laminar graphene structure is composed of multiple graphene sheets being alternately spaced by thin electrolyte layers, from 0.3 nm to 10 nm in thickness, wherein the multiple graphene sheets are substantially aligned along a desired direction parallel to the cathode roll length and cathode roll width and perpendicular to said cathode roll thickness; (c) aligning the anode roll, the cathode roll, and an ion-conducting separator between the anode roll and the cathode roll together to form a supercapacitor assembly in such a manner that the anode roll width and/or the cathode roll width direction is substantially perpendicular to the separator plane; and (d) sealing the supercapacitor assembly in a protective casing to form the rolled supercapacitor.

In the above process, the layer of electrolyte-impregnated laminar graphene structure in the anode roll or the cathode roll may be prepared by a procedure comprising: (i) preparing a graphene dispersion having multiple isolated graphene sheets dispersed in a liquid or gel electrolyte; (ii) subjecting the graphene dispersion to a forced assembly procedure, forcing the multiple graphene sheets and the electrolyte to assemble into a layer of the electrolyte-impregnated laminar graphene structure having a layer plane and a layer thickness, wherein the multiple graphene sheets are alternately spaced by thin electrolyte layers, having a thickness from 0.4 nm to 10 nm, and the multiple graphene sheets are substantially aligned along a desired direction parallel to the layer plane and perpendicular to the layer thickness direction, and wherein the laminar graphene structure has a physical density from 0.5 to 1.7 $g/cm^3$ and a specific surface area from 50 to 3,300 $m^2/g$, when measured in a dried state of the laminar structure with the electrolyte removed; and (iii) winding said layer of said electrolyte-impregnated laminar graphene structure into a roll shape.

The forced assembly procedure preferably includes introducing a first layer of graphene dispersion onto a surface of a supporting conveyor and driving the layer of graphene suspension supported on the conveyor through at least a pair of pressing rollers to reduce a thickness of the graphene dispersion layer and align the multiple graphene sheets along a direction parallel to the conveyor surface for forming a layer of electrolyte-impregnated laminar graphene structure.

The process preferably further includes a step of introducing a second layer of graphene dispersion onto a surface of the layer of electrolyte-impregnated laminar graphene structure to form a two layer laminar structure, and driving the two-layer laminar structure through at least a pair of pressing rollers to reduce a thickness of the second layer of graphene dispersion and align the multiple graphene sheets along a direction parallel to the conveyor surface for forming a layer of electrolyte-impregnated laminar graphene structure. The same procedure may be repeated by allowing the conveyor to move toward a third set of pressing rollers, depositing additional (third) layer of graphene dispersion onto the two-layer structure, and forcing the resulting 3-layer structure to go through the gap between the two rollers in the third set to form a further compacted, electrolyte-impregnated laminar graphene structure.

The process may further include a step of compressing or roll-pressing the electrolyte-impregnated laminar structure to reduce the electrolyte layer thickness in the impregnated laminar structure, improve orientation of graphene sheets, and squeeze excess electrolyte out of the impregnated laminar graphene structure for forming the supercapacitor electrode.

The process is preferably a roll-to-roll (reel-to-reel) process wherein the forced assembly procedure includes feeding the supporting conveyor, in a continuous film form, from a feeder roller to a deposition zone, continuously or intermittently depositing the graphene dispersion onto a surface of the supporting conveyor film to form the layer of graphene dispersion thereon, and collecting the layer of electrolyte-impregnated laminar graphene structure, supported on conveyor film, on a collector roller.

The process may further comprise a step of cutting or slitting the electrolyte-impregnated laminar graphene structure into multiple sheets of desired dimensions prior to being wound into multiple rolls.

The process may further comprise a step of attaching the electrolyte-impregnated laminar graphene structure to a current collector, wherein the graphene sheets are aligned parallel to a primary surface of the current collector.

The graphene dispersion may contain a graphene oxide dispersion prepared by immersing a graphitic material in a powder or fibrous form in an oxidizing liquid in a reaction vessel at a reaction temperature for a length of time sufficient to obtain said graphene dispersion wherein said graphitic material is selected from natural graphite, artificial graphite, meso-phase carbon, meso-phase pitch, meso-carbon microbead, soft carbon, hard carbon, coke, carbon fiber, carbon nano-fiber, carbon nano-tube, or a combination thereof and wherein said graphene oxide has an oxygen content no less than 5% by weight.

DESCRIPTION OF THE PREFERRED EMBODIMENTS

Figure 2A:
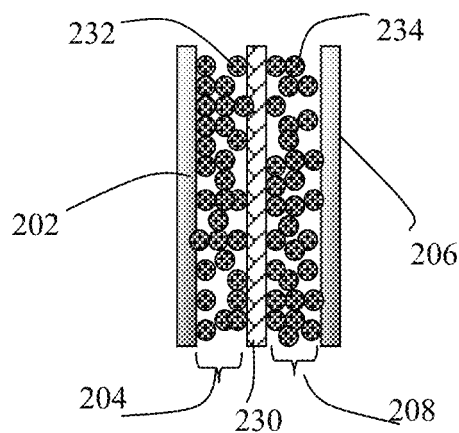
FIG. 2(A) Schematic of a conventional activated carbon-based supercapacitor cell.

As schematically illustrated in FIG. 2(A), a prior art supercapacitor cell is typically composed of an anode current collector 202 (e.g. Al foil 12-15 µm thick), an anode active material layer 204 (containing an anode active material, such as activated carbon particles 232 and conductive additives that are bonded by a resin binder, such as PVDF), a porous separator 230, a cathode active material layer 208 (containing a cathode active material, such as activated carbon particles 234, and conductive additives that are all bonded by a resin binder, not shown), a cathode current collector 206 (e.g. Al foil), and a liquid electrolyte disposed in both the anode active material layer 204 (also simply referred to as the "anode layer") and the cathode active material layer 208 (or simply "cathode layer"). The entire cell is encased in a protective housing, such as a thin plastic-aluminum foil laminate-based envelop. The prior art supercapacitor cell is typically made by a process that includes the following steps:

a) The first step is mixing particles of the anode active material (e.g. activated carbon), a conductive filler (e.g. graphite flakes), a resin binder (e.g. PVDF) in a solvent (e.g. NMP) to form an anode slurry. On a separate basis, particles of the cathode active material (e.g. activated carbon), a conductive filler (e.g. acetylene black), a resin binder (e.g. PVDF) are mixed and dispersed in a solvent (e.g. NMP) to form a cathode slurry.

b) The second step includes coating the anode slurry onto one or both primary surfaces of an anode current collector (e.g. Cu or Al foil), drying the coated layer by vaporizing the solvent (e.g. NMP) to form a dried anode electrode coated on Cu or Al foil. Similarly, the cathode slurry is coated and dried to form a dried cathode electrode coated on Al foil.

c) The third step includes laminating an anode/Al foil sheet, a porous separator layer, and a cathode/Al foil sheet together to form a 3-layer or 5-layer assembly, which is cut and slit into desired sizes and stacked to form a rectangular structure (as an example of shape) or rolled into a cylindrical cell structure.

d) The rectangular or cylindrical laminated structure is then encased in a laminated aluminum-plastic envelope or steel casing.

e) A liquid electrolyte is then injected into the laminated housing structure to make a supercapacitor cell.

There are several serious problems associated with this conventional process and the resulting supercapacitor cell:

1) It is very difficult to produce an electrode layer (anode layer or cathode layer) that is thicker than 100 μm and practically impossible or impractical to produce an electrode layer thicker than 200 μm. There are several reasons why this is the case. An electrode of 100 μm thickness typically requires a heating zone of at least 30-50 meters long in a slurry coating facility, which is too time consuming, too energy intensive, and not cost-effective. A heating zone longer than 100 meters is not unusual.

2) For some electrode active materials, such as graphene sheets, it has not been possible to produce an electrode thicker than 50 μm in a real manufacturing environment on a continuous basis. This is despite the notion that some thicker electrodes have been claimed in open or patent literature, which were prepared in a laboratory on a small scale. In a laboratory setting, presumably one could repeatedly add new materials to a layer and manually consolidate the layer to increase the thickness of an electrode. However, even with such a procedure, the resulting electrode becomes very fragile and brittle. This is even worse for graphene-based electrodes, since repeated compressions lead to re-stacking of graphene sheets and, hence, significantly reduced specific surface area and reduced specific capacitance.

3) With a conventional supercapacitor, as depicted in FIG. 2(A), the actual mass loadings of the electrodes and the apparent densities for the active materials are too low. In most cases, the active material mass loadings of the electrodes (areal density) is significantly lower than 10 mg/cm$^2$ and the apparent volume density or tap density of the active material is typically less than 0.75 g/cm$^3$ (more typically less than 0.5 g/cm$^3$ and most typically less than 0.3 g/cm$^3$) even for relatively large particles of activated carbon. In addition, there are so many other non-active materials (e.g. conductive additive and resin binder) that add additional weights and volumes to the electrode without contributing to the cell capacity. These low areal densities and low volume densities result in relatively low volumetric capacitances and low volumetric energy density.

4) The conventional process requires dispersing electrode active materials (anode active material and cathode active material) in a liquid solvent (e.g. NMP) to make a wet slurry and, upon coating on a current collector surface, the liquid solvent has to be removed to dry the electrode layer. Once the anode and cathode layers, along with a separator layer, are laminated together and packaged in a housing to make a supercapacitor cell, one then injects a liquid electrolyte into the cell. In actuality, one makes the two electrodes wet, then makes the electrodes dry, and finally makes them wet again. Such a wet-dry-wet process is clearly not a good process at all.

5) Current supercapacitors (e.g. symmetric supercapacitors or electric double layer capacitors, EDLC) still suffer from a relatively low gravimetric energy density and low volumetric energy density. Commercially available EDLCs exhibit a gravimetric energy density of approximately 6 Wh/kg and no experimental EDLC cells have been reported to exhibit a cell-level energy density higher than 10 Wh/kg (based on the total cell weight) at room temperature. Although experimental supercapacitors can exhibit large volumetric electrode capacitances (50 to 100 F/cm$^3$ in most cases) at the electrode level, their typical active mass loading of <1 mg/cm$^2$, tap density of <0.1 g/cm$^3$ and electrode thicknesses of up to tens of micrometers in these experimental cells remain significantly lower than those used in most commercially available electrochemical capacitors, resulting in energy storage devices with relatively low areal and volumetric capacities and low volumetric energy densities based on the cell (device) weight.

In literature, the energy density data reported based on either the active material weight alone or electrode weight cannot directly translate into the energy densities of a practical supercapacitor cell or device. The "overhead weight" or weights of other device components (binder, conductive additive, current collectors, separator, electrolyte, and packaging) must also be taken into account. The convention production process results in an active material proportion being less than 30% by weight of the total cell weight (<15% in some cases; e.g. for graphene-based active material).

Figure 2B:
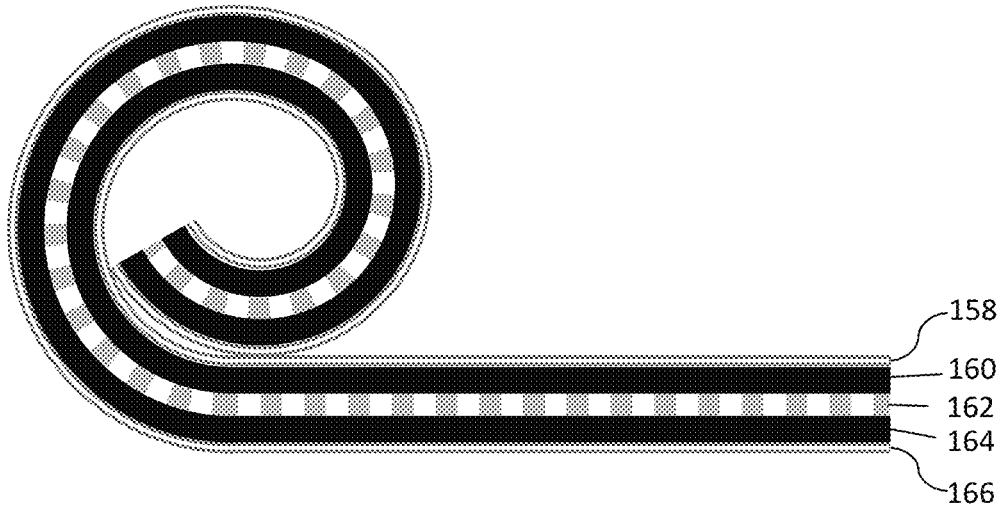
FIG. 2(B) Schematic of part of an internal structure of a prior art cylindrical supercapacitor cell, indicating the roll contains a laminated structure of an anode layer coated on an anode current collector, a porous separator, and a cathode layer coated on a cathode current collector, which is wound to form a cylindrical roll.

Schematically shown in FIG. 2(B) is part of an internal structure of a prior art cylindrical supercapacitor cell, indicating that each cell contains a roll, which is composed of a laminate of an anode layer 110 coated on an anode current collector 108, a porous separator 112, and a cathode layer 114 coated on a cathode current collector 116. Each roll contains both the anode and the cathode active material layers therein. There is only one roll in one unit cell.

Figure 2C:
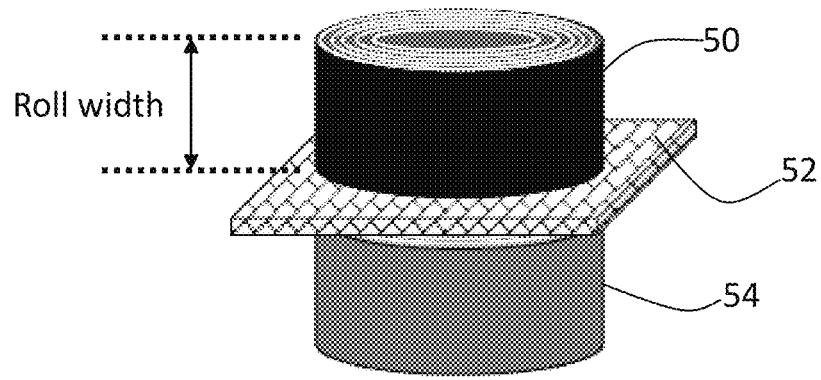
FIG. 2(C) Schematic drawing of a presently invented rolled supercapacitor.
Figure 2D:
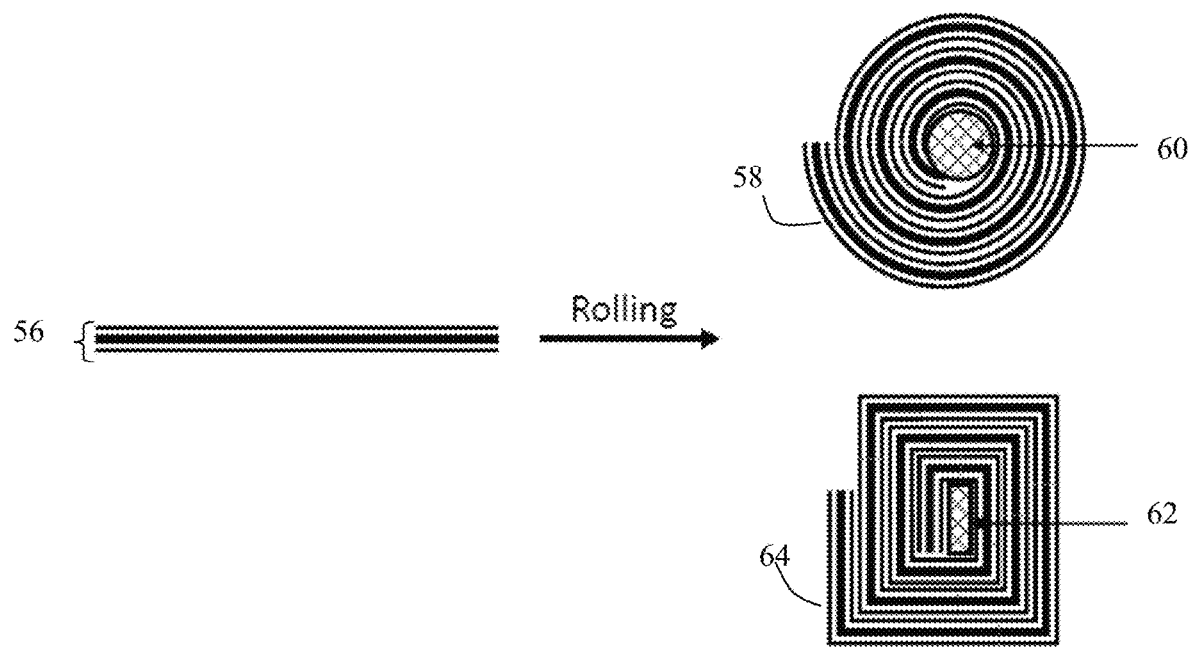
FIG. 2(D) Schematic drawing of a process for winding an anode or cathode active material-coated solid substrate around a mandrel (60 or 62) to form a cylindrical roll 58 or cuboidal roll 54.
Figure 2E:
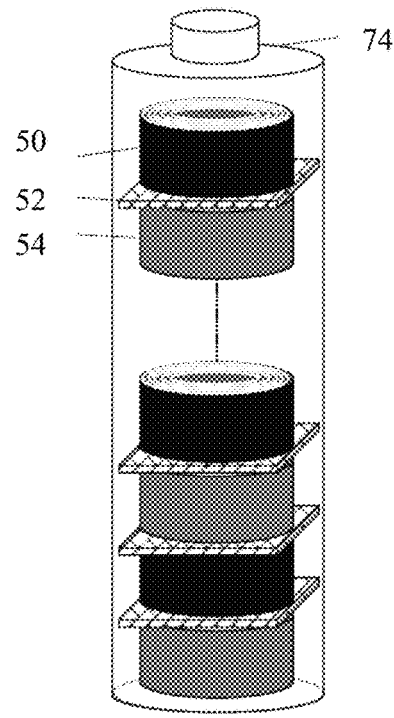
FIG. 2(E) Schematic of a presently invented supercapacitor containing multiple rolled cells internally connected in series.

In contrast, in the presently invented rolled supercapacitor (FIG. 2(C)), one unit cell contains at least two separate rolls: a cathode roll 50 and an anode roll 54, which are separated by a porous membrane or alkali metal ion-conducting separator layer 52. As schematically shown in FIG. 2(D), the anode roll may be formed by winding an anode active material-coated film or layer 56 around a mandrel with a desired cross-section shape, such as a circle 60 or a rectangle 62, to form a cylinder roll 58 or cuboid roll 64, respectively. The anode active material-coated film or layer may be an anode active material layer-coated Al foil produced by the conventional slurry coating process. The anode active material layer may contain a conductive additive and a resin binder. The coated film or layer may be slit/cut into a desired width (which becomes the roll width after the coated film/layer is wound into a roll). The coated layer is then rolled or wound into an anode roll of a desired shape. The cathode roll may be produced in a similar manner. One anode roll, one sheet of porous separator, and one cathode roll may be assembled together to form one rolled battery cell, as illustrated in FIG. 2(C), wherein the roll width is perpendicular to the separator plane.

By arranging the roll layer width normal to the separator, the pore channels originally parallel to the current collector can be aligned to facilitate the ionic conduction in the electrode layers. The present invention provides a rolled supercapacitor cell having a high roll width (corresponding to the thickness of a conventional electrode) and, thus, a high active material mass loading. The cell also has a low overhead weight and volume, high volumetric capacitance, and high volumetric energy density. In addition, the manufacturing costs of the presently invented rolled supercapacitor produced by the presently invented process can be significantly lower than those by conventional processes.

The present invention provides a rolled supercapacitor cell having a high electrode layer (roll) width (no theoretical limitation on the electrode roll width that can be made by using the presently invented process), high active material mass loading (and high overall electrode mass and volume), low overhead weight and volume, high volumetric capacitance, and high volumetric energy density.

The invented rolled supercapacitor comprises an anode, a cathode, a porous separator electronically separating the anode and the cathode, and an electrolyte in ionic contact with the anode and the cathode, wherein the anode contains a wound anode roll of an anode active material having an anode roll length, an anode roll width, and an anode roll thickness, wherein the anode active material contains isolated graphene sheets that are oriented substantially parallel to the plane defined by the anode roll length and the anode roll width; and/or the cathode contains a wound cathode roll of a cathode active material having a cathode roll length, a cathode roll width, and a cathode roll thickness, wherein the cathode active material contains isolated graphene sheets that are oriented substantially parallel to the plane defined by the cathode roll length and the cathode roll width; and wherein the anode roll width and/or the cathode roll width is substantially perpendicular to the separator plane. The preferred orientation of graphene sheets, being normal to the separator plane, is found to be conducive to fast responses of massive charges and, thus, high power density of the resulting supercapacitor.

Typically, the rolled supercapacitor further contains an anode tab connected to or integral with the anode and a cathode tab connected to or integral with the cathode. Preferably and typically, the rolled supercapacitor further comprises a casing that encloses the anode, the cathode, the separator, and the electrolyte therein to form a sealed battery.

In some cases (herein referred to as Type-II rolled supercapacitor for convenience), the anode roll or the cathode roll may contain electrode active material (i.e. oriented graphene sheets) that are present alone (along with an electrolyte) without being supported on a solid or porous supporting substrate. In other cases (Type-I), the oriented graphene sheets are coated onto a solid substrate or impregnated into pores of a porous substrate, possibly along with some optional conductive additive and optional binder resin.

In these latter rolled supercapacitors (Type-I), the wound anode roll of an anode active material contains (a) a layer of supporting solid substrate having two primary surfaces wherein either one or both of the primary surfaces are coated with the anode active material, an optional conductive additive, and an optional binder or (b) a layer of supporting porous substrate having pores that are impregnated with the anode active material, an optional conductive additive, and an optional binder. In certain embodiments, the wound cathode roll of a cathode active material may contain (a) a layer of supporting solid substrate having two primary surfaces wherein either one or both of the primary surfaces are coated with the cathode active material, an optional conductive additive, and an optional binder or (b) a layer of supporting porous substrate having pores that are impregnated with the cathode active material, an optional conductive additive, and an optional binder.

In the former cases (Type-II), the electrolyte and the isolated graphene sheets in the anode or the cathode of the invented rolled supercapacitor are assembled into an electrolyte-impregnated laminar graphene structure that is wound into an anode roll or a cathode roll, wherein the isolated graphene sheets are alternately spaced by thin electrolyte layers, having a thickness from 0.3 nm to 10 nm, and the laminar graphene structure has a physical density from 0.5 to 1.7 $g/cm^3$ and a specific surface area from 50 to 3,300 $m^2/g$, when measured in a dried state of the laminar structure with said electrolyte removed. In these cases, the electrode produced has been pre-impregnated with an electrolyte (aqueous, organic, ionic liquid, or polymer gel), wherein all graphene surfaces have been wetted with a thin layer of electrolyte (hence, no dry spots) and all graphene sheets have been well-aligned along one direction and closely packed together. The graphene sheets are alternatingly spaced with ultra-thin layers of electrolyte (0.3 nm to <10 nm, more typically <5 nm, most typically <2 nm). The process obviates the need to go through the lengthy and environmentally unfriendly wet-dry-wet procedures of the prior art process.

A particularly desirable embodiment of the present invention is a rolled supercapacitor (Type-II) comprising an anode current collector, an anode, a cathode, a cathode current collector, an ion-permeable separator that electronically separates the anode and the cathode, and an electrolyte in ionic contact with the anode and the cathode, wherein the anode and/or the cathode contains a wound roll of an electrolyte-impregnated laminar graphene structure, which is composed of multiple graphene sheets being alternately spaced by thin electrolyte layers, less than 5 nm in thickness (typically from 0.3 nm to 5 nm), and the multiple graphene sheets are substantially aligned along a desired direction perpendicular to the separator, and wherein the laminar graphene structure has a physical density from 0.5 to 1.7 $g/cm^3$ and a specific surface area from 50 to 3,300 $m^2/g$, when measured in a dried state of the laminar graphene structure with the electrolyte removed.

Figure 2F:
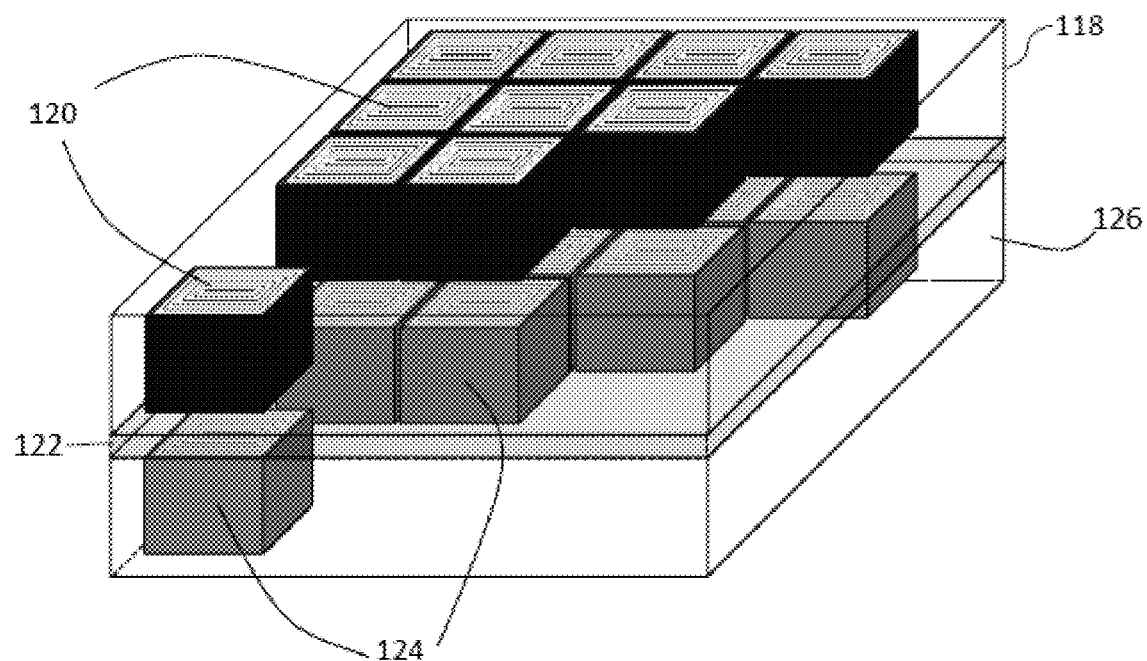
FIG. 2(F) Schematic of a presently invented supercapacitor containing multiple rolled cells internally connected in parallel.

As shown in FIG. 2(C), one anode roll and one cathode roll, separated by a porous separator, are assembled to form a unit cell. As illustrated in FIG. 2(F), multiple unit cells (each containing an anode roll 50, a separator 52, and a cathode roll 54) may be internally connected in series and sealed inside a casing 74 (e.g. a cylindrical stainless steel housing) to form a supercapacitor of a multiplied or significantly higher output voltage level. For instance, unit cell 1 having a voltage $V_1$, unit cell 2 having a voltage $V_2$, etc. (up to unit cell n having a voltage $V_n$) may be internally connected to form an output voltage $V=V_1+V_2+ \ldots +V_n$. If $V_1=V_2=V_3= \ldots =V_n$, then the overall output voltage is $V_n=n V_1$. Assume one unit battery cell has an output voltage of 3.0 volts, then one cylinder containing 6 unit cells connected in series will provide a battery output voltage of 18 volts. There is nothing in supercapacitor industry that a cylindrical supercapacitor can deliver a battery voltage higher than 4.5 volts. Further, the instant invention enables design and construction of a supercapacitor that can have essentially any output voltage. These are some additional surprising and useful features of the presently invented rolled supercapacitors.

Alternatively, multiple unit cells may be internally connected in parallel to form a supercapacitor that can deliver massive power and energy. A preferred and unique configuration of such a supercapacitor is illustrated in FIG. 2(F), wherein multiple cathode rolls 124 being parallel to each other are packed together to form approximately first half 126 of the massive-power supercapacitor. A corresponding pack of multiple anode rolls 120 are also arranged to be parallel to one another to form approximately the other half 118 of the supercapacitor. The two packs are then combined together, but separated by a porous separator 122, to form a complete supercapacitor. There is no theoretical limitation on the number of anode rolls or cathode rolls in such a supercapacitor. The output voltage is typically the same as the output voltage of the constituent cells (provided these unit cells are identical in composition and structure). However, the output current can be massive since there are large amounts of active materials contained in such a supercapacitor. It may be noted that the anode rolls or the cathode rolls can assume any cross-sectional shape (e.g. circular, square, rectangle, etc.) even though a square shape is shown in FIG. 2(F).

The process for producing a Type-I rolled supercapacitor may include some initial procedures commonly used to make conventional supercapacitors, followed by additional steps to create the rolled electrodes. The first step is mixing isolated graphene sheets, an optional conductive filler (e.g. graphite flakes), a resin binder (e.g. PVDF) in a solvent (e.g. NMP) to form an anode slurry. On a separate basis, isolated graphene sheets, an optional conductive filler (e.g. acetylene black), a resin binder (e.g. PVDF) are mixed and dispersed in a solvent (e.g. NMP) to form a cathode slurry.

The second step includes coating the anode slurry onto one or both primary surfaces of an anode current collector (e.g. Al foil or Ni foam), drying the coated layer by vaporizing the solvent (e.g. NMP) to form a dried anode electrode coated on Al foil or Ni foam to form a two-layer or three-layer anode layer structure. The anode layer structure is then wound into a roll shape to form an anode roll. Similarly, the cathode slurry is coated and dried to form a dried cathode electrode coated on Al foil or Ni foam. The resulting two-layer or three-layer cathode layer structure is then wound into a roll shape to form a cathode roll. The rolls may be cut and slit into desired sizes and shapes as desired.

The third step includes assembling an anode roll, a porous separator layer, and a cathode roll to form a supercapacitor assembly, which is then encased in a laminated aluminum-plastic envelope or steel casing. A liquid electrolyte is then injected into the laminated housing structure, which is then sealed to make a rolled supercapacitor cell.

Alternatively, for the production of a Type-II rolled supercapacitor, the process begins with the production of an electrolyte-impregnated laminar graphene structure, which is then wound into a roll shape for use as a supercapacitor electrode. In a preferred embodiment, the process comprises: (a) preparing a graphene dispersion having multiple isolated graphene sheets dispersed in a liquid or gel electrolyte; and (b) subjecting the graphene dispersion to a forced assembly procedure, forcing the multiple graphene sheets to assemble into the electrolyte-impregnated laminar graphene structure, wherein the multiple graphene sheets are alternately spaced by thin electrolyte layers, less than 10 nm (preferably <5 nm) in thickness, and the multiple graphene sheets are substantially aligned along a desired direction, and wherein the laminar graphene structure has a physical density from 0.5 to 1.7 g/cm$^3$ (more typically 0.7-1.3 g/cm$^3$) and a specific surface area from 50 to 3,300 m$^2$/g (50 to 2,630 m$^2$/g, if the graphene sheets are not chemically activated), when measured in a dried state of the laminar structure with the electrolyte removed.

In some desired embodiments, the forced assembly procedure includes preparing a graphene dispersion, which contains isolated graphene sheets well-dispersed in a liquid or gel electrolyte. In this dispersion, practically each and every isolated graphene sheet is surrounded by electrolyte species that are physically adsorbed to or chemically bonded to the graphene surface. During the subsequent consolidating and aligning operation, isolated graphene sheets remain isolated or separated from one another through electrolyte (electrolyte serving as a spacer that prevents contacting and re-stacking of graphene sheets). Upon removal of the excess electrolyte, graphene sheets remain spaced apart by electrolyte and this electrolyte-filled space can be as small as 0.3 nm (typically 0.3 nm to 2 nm, but can be larger). Contrary to the prior art teaching that the pores in activated carbon particles or between graphene sheets must be at least 2 nm in order to allow for entry of liquid electrolyte and the formation of electric double layers of charges in the electrolyte phase (but near the electrolyte-solid interface), we have discovered that the electrolyte spacer as small as 0.3 nm is capable of storing charges and there is no longer any electrolyte entry issue since the graphene sheets have been pre-wetted with electrolyte. In other words, since the electrolyte has been pre-loaded into the spaces between isolated graphene sheets, there is no electrolyte inaccessibility issue in the presently invented supercapacitor. The present invention has essentially overcome all the significant, longstanding shortcomings of using graphene as a supercapacitor electrode active material.

Figure 3:
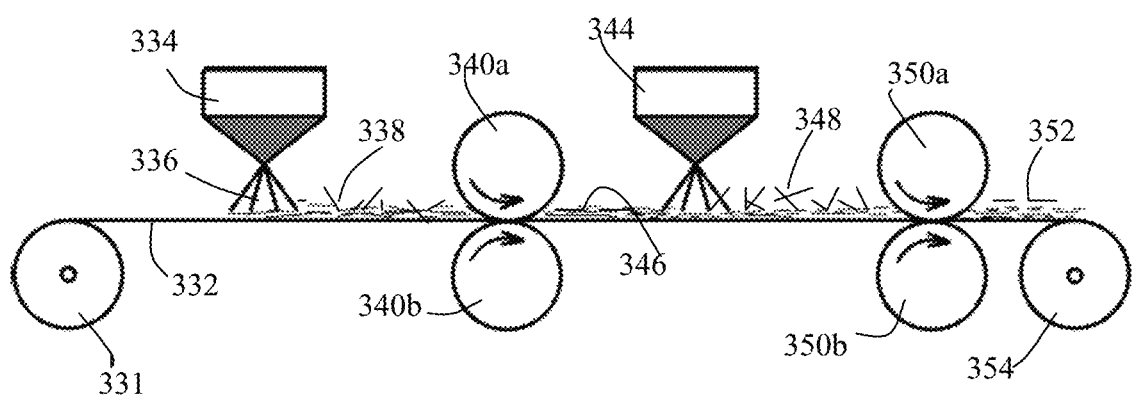
FIG. 3 A roll-to-roll (reel-to-reel) process for producing a layer of electrolyte-impregnated laminar graphene structure. Graphene sheets are well-aligned on the supporting substrate plane. The structure is then wound into a roll shape.

FIG. 3 shows a roll-to-roll process for producing a layer of electrolyte-impregnated laminar graphene structure. This process begins by feeding a continuous solid substrate 332 (e.g. PET film or stainless steel sheet) from a feeder roller 331. A dispenser 334 is operated to dispense dispersion 336 of isolated graphene sheets and electrolyte onto the substrate surface to form a layer of deposited dispersion 338, which feeds through the gap between two compressing rollers, 340a and 340b, to form a layer of electrolyte-impregnated, highly oriented graphene sheets. The graphene sheets are well-aligned on the supporting substrate plane. If so desired, a second dispenser 344 is then operated to dispense another layer of dispersion 348 on the surface of the previously consolidated dispersion layer. The two-layer structure is then driven to pass through the gap between two roll-pressing rollers 350a and 350b to form a thicker layer 352 of electrolyte-impregnated laminar graphene structure, which is taken up by a winding roller 354. In certain embodiments, one can unwind the layer of electrolyte-impregnated laminar graphene structure, peel off from the PET film, and cut/slit the layer into individual sheets of desired length and wide. These sheets can be separately wound into electrode rolls of desired shape and dimensions.

Thus, in some preferred embodiments, the forced assembly procedure includes introducing a first layer of the graphene dispersion onto a surface of a supporting conveyor and driving the layer of graphene suspension supported on the conveyor through at least a pair of pressing rollers to reduce the thickness of the graphene dispersion layer and align the multiple graphene sheets along a direction parallel to the conveyor surface for forming a layer of electrolyte-impregnated laminar graphene structure.

If necessary, the process may further include a step of introducing a second layer of the graphene dispersion onto a surface of the layer of electrolyte-impregnated laminar structure to form a two layer laminar structure, and driving the two-layer laminar structure through at least a pair of pressing rollers to reduce a thickness of the second layer of graphene dispersion and align the multiple graphene sheets along a direction parallel to the conveyor surface for forming a layer of electrolyte-impregnated laminar structure. The same procedure may be repeated by allowing the conveyor to move toward a third set of pressing rollers, depositing additional (third) layer of graphene dispersion onto the two-layer structure, and forcing the resulting 3-layer structure to go through the gap between the two rollers in the third set to form a further compacted, electrolyte-impregnated laminar graphene structure.

The above paragraphs about FIG. 3 are but one of the many examples of possible apparatus or processes that can be adapted to produce electrolyte-impregnated laminar graphene strictures that contain highly oriented and closely packed graphene sheets spaced by thin layers of electrolyte. The conventional paper-making procedures may also be adapted to produce electrolyte-impregnated graphene paper, which is then compressed or roll-pressed between a pair of two rollers to produce the electrolyte-impregnated laminar graphene structure containing highly oriented graphene sheets (being oriented along the laminar plane). This structure is then wound into a roll shape to produce an electrode roll, which now contains graphene sheets oriented on the plane defined by the roll length and roll width and perpendicular to the roll thickness.

In a preferred embodiment, the graphene material in the dispersion is selected from pristine graphene, graphene oxide, reduced graphene oxide, graphene fluoride, graphene chloride, graphene bromide, graphene iodide, hydrogenated graphene, nitrogenated graphene, chemically functionalized graphene, doped graphene, or a combination thereof. The starting graphitic material for producing any one of the above graphene materials may be selected from natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof.

For instance, the graphene oxide (GO) may be obtained by immersing powders or filaments of a starting graphitic material (e.g. natural graphite powder) in an oxidizing liquid medium (e.g. a mixture of sulfuric acid, nitric acid, and potassium permanganate) in a reaction vessel at a desired temperature for a period of time (typically from 0.5 to 96 hours, depending upon the nature of the starting material and the type of oxidizing agent used). The resulting graphite oxide particles may then be subjected to thermal exfoliation or ultrasonic wave-induced exfoliation to produce isolated GO sheets.

Pristine graphene may be produced by direct ultrasonication (also known as liquid phase production) or supercritical fluid exfoliation of graphite particles. These processes are well-known in the art. Multiple pristine graphene sheets may be dispersed in water or other liquid medium with the assistance of a surfactant to form a suspension. A chemical blowing agent may then be dispersed into the dispersion (38 in FIG. 1(A)). This suspension is then cast or coated onto the surface of a solid substrate (e.g. glass sheet or Al foil). When heated to a desired temperature, the chemical blowing agent is activated or decomposed to generate volatile gases (e.g. $N_2$ or $CO_2$), which act to form bubbles or pores in an otherwise mass of solid graphene sheets, forming a pristine graphene foam 40a. Such a foam may be used as a porous supporting substrate.

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished [F. Karlicky, et al. "*Halogenated Graphenes: Rapidly Growing Family of Graphene Derivatives*" ACS Nano, 2013, 7 (8), pp 6434-6464].

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultrasonic treatment of a graphite fluoride in a liquid medium.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

The aforementioned features are further described and explained in detail as follows: As illustrated in FIG. 1(B), a graphite particle (e.g. 100) is typically composed of multiple graphite crystallites or grains. A graphite crystallite is made up of layer planes of hexagonal networks of carbon atoms. These layer planes of hexagonally arranged carbon atoms are substantially flat and are oriented or ordered so as to be substantially parallel and equidistant to one another in a particular crystallite. These layers of hexagonal-structured carbon atoms, commonly referred to as graphene layers or basal planes, are weakly bonded together in their thickness direction (crystallographic c-axis direction) by weak van der Waals forces and groups of these graphene layers are arranged in crystallites. The graphite crystallite structure is usually characterized in terms of two axes or directions: the c-axis direction and the a-axis (or b-axis) direction. The c-axis is the direction perpendicular to the basal planes. The a- or b-axes are the directions parallel to the basal planes (perpendicular to the c-axis direction).

A highly ordered graphite particle can consist of crystallites of a considerable size, having a length of $L_a$ along the crystallographic a-axis direction, a width of $L_b$ along the crystallographic b-axis direction, and a thickness $L_c$ along the crystallographic c-axis direction. The constituent graphene planes of a crystallite are highly aligned or oriented with respect to each other and, hence, these anisotropic structures give rise to many properties that are highly directional. For instance, the thermal and electrical conductivity of a crystallite are of great magnitude along the plane directions (a- or b-axis directions), but relatively low in the perpendicular direction (c-axis). As illustrated in the upper-left portion of FIG. 1(B), different crystallites in a graphite particle are typically oriented in different directions and, hence, a particular property of a multi-crystallite graphite particle is the directional average value of all the constituent crystallites.

Due to the weak van der Waals forces holding the parallel graphene layers, natural graphite can be treated so that the spacing between the graphene layers can be appreciably opened up so as to provide a marked expansion in the c-axis direction, and thus form an expanded graphite structure in which the laminar character of the carbon layers is substantially retained. The process for manufacturing flexible graphite is well-known in the art. In general, flakes of natural graphite (e.g. 100 in FIG. 1(B)) are intercalated in an acid solution to produce graphite intercalation compounds (GICs, 102). The GICs are washed, dried, and then exfoliated by exposure to a high temperature for a short period of time. This causes the flakes to expand or exfoliate in the c-axis direction of the graphite up to 80-300 times of their original dimensions. The exfoliated graphite flakes are vermiform in appearance and, hence, are commonly referred to as worms 104. These worms of graphite flakes which have been greatly expanded can be formed without the use of a binder into cohesive or integrated sheets of expanded graphite, e.g. webs, papers, strips, tapes, foils, mats or the like (typically referred to as "flexible graphite" 106) having a typical density of about 0.04-2.0 g/cm³ for most applications. This can be used as a solid or porous supporting substrate in making the instant roll electrode.

Figure 1A:
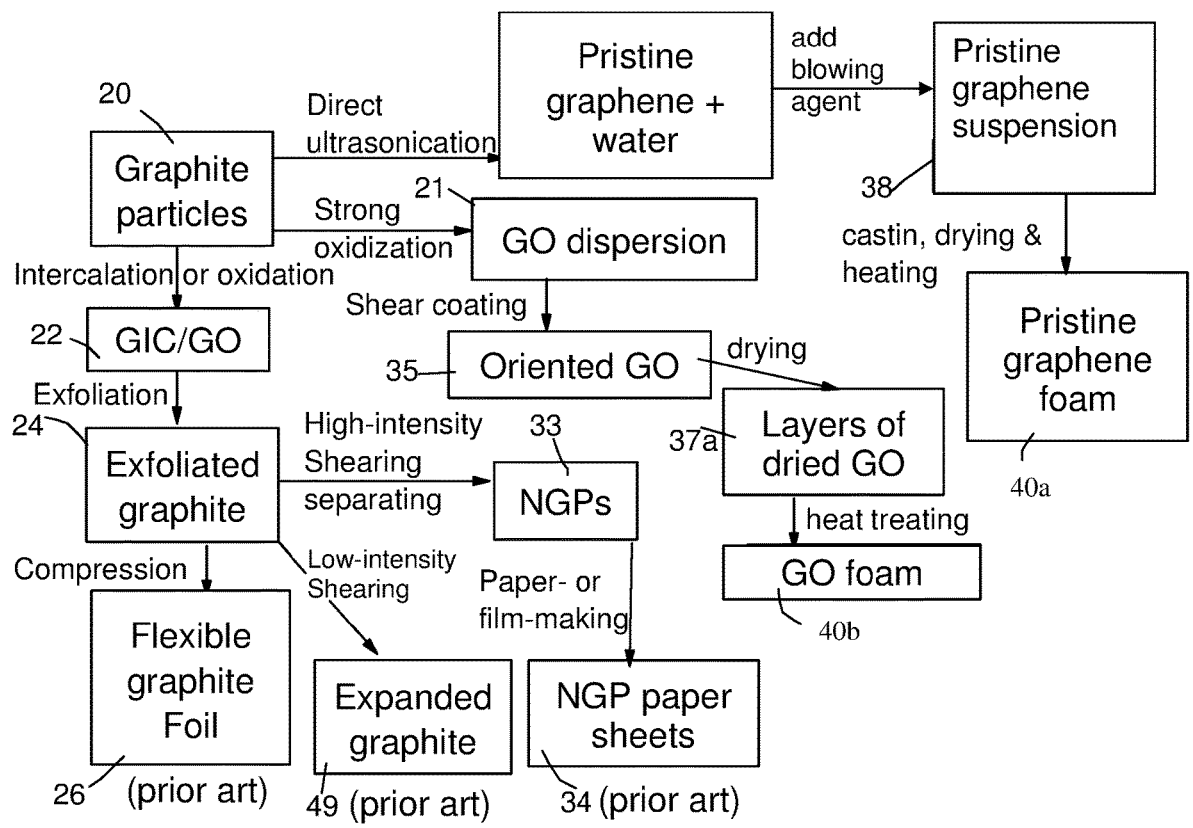
FIG. 1(A) A flow chart illustrating various prior art processes of producing exfoliated graphite products (flexible graphite foils and expanded graphite flakes), along with a process for producing pristine graphene foam 40a or graphene oxide foams 40b.
Figure 1B:
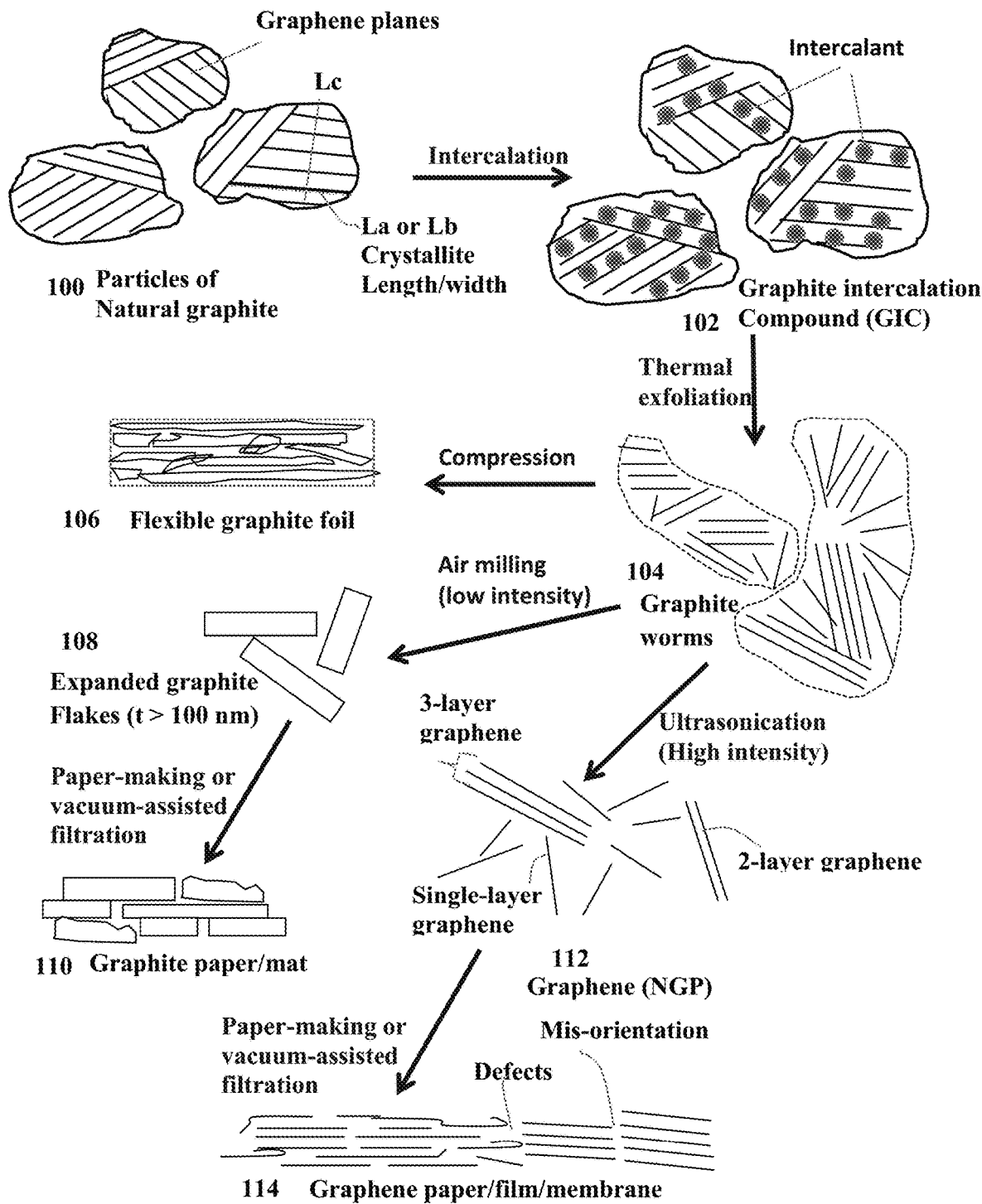
FIG. 1(B) Schematic drawing illustrating the processes for producing conventional paper, mat, film, and membrane of simply aggregated graphite flakes (>100 nm thick) or graphene sheets (<10 nm in thickness, more preferably <2 nm, and most preferably single-layer graphene). All processes begin with intercalation and/or oxidation treatment of graphitic materials (e.g. natural graphite particles).

The upper left portion of FIG. 1(A) shows a flow chart that illustrates the prior art processes used to fabricate flexible graphite foils. The processes typically begin with intercalating graphite particles 20 (e.g., natural graphite or synthetic graphite) with an intercalant (typically a strong acid or acid mixture) to obtain a graphite intercalation compound 22 (GIC). After rinsing in water to remove excess acid, the GIC becomes "expandable graphite." The GIC or expandable graphite is then exposed to a high temperature environment (e.g., in a tube furnace preset at a temperature in the range of 800-1,050° C.) for a short duration of time (typically from 15 seconds to 2 minutes). This thermal treatment allows the graphite to expand in its c-axis direction by a factor of 30 to several hundreds to obtain a worm-like vermicular structure 24 (graphite worm), which contains exfoliated, but un-separated graphite flakes with large pores interposed between these interconnected flakes.

In one prior art process, the exfoliated graphite (or mass of graphite worms) is re-compressed by using a calendaring or roll-pressing technique to obtain flexible graphite foils (26 in FIG. 1(A) or 106 in FIG. 1(B)), which are typically 100-300 µm thick. In another prior art process, the exfoliated graphite worm 24 may be impregnated with a resin and then compressed and cured to form a flexible graphite composite, which is normally of low strength as well. In addition, upon resin impregnation, the electrical and thermal conductivity of the graphite worms could be reduced by two orders of magnitude.

Alternatively, the exfoliated graphite may be subjected to high-intensity mechanical shearing/separation treatments using a high-intensity air jet mill, high-intensity ball mill, or ultrasonic device to produce separated nano graphene platelets 33 (NGPs) with all the graphene platelets thinner than 100 nm, mostly thinner than 10 nm, and, in many cases, being single-layer graphene (also illustrated as 112 in FIG. 1(B)). An NGP is composed of a graphene sheet or a plurality of graphene sheets with each sheet being a two-dimensional, hexagonal structure of carbon atoms. A mass of multiple NGPs (including discrete sheets/platelets of single-layer and/or few-layer graphene or graphene oxide, 33 in FIG. 1(A)) may be made into a graphene film/paper (34 in FIG. 1(A) or 114 in FIG. 1(B)) using a film- or paper-making process.

Further alternatively, with a low-intensity shearing, graphite worms tend to be separated into the so-called expanded graphite flakes (108 in FIG. 1(B) having a thickness>100 nm. These flakes can be formed into graphite paper or mat 106 using a paper- or mat-making process. This expanded graphite paper or mat 106 is just a simple aggregate or stack of discrete flakes having defects, interruptions, and mis-orientations between these discrete flakes.

The isolated graphene sheets may be further subjected to the following treatments, separately or in combination, prior to being dispersed in the electrolyte:

(a) Being chemically functionalized or doped with atomic, ionic, or molecular species. Useful surface functional groups may include quinone, hydroquinone, quaternized aromatic amines, mercaptans, or disulfides. This class of functional groups can impart pseudo-capacitance to graphene-based supercapacitors.

(b) coated or grafted with an intrinsically conductive polymer (conducting polymers, such as polyacetylene, polypyrrole, polyaniline, polythiophene, and their derivatives, are good choices for use in the present invention); These treatments are intended for further increasing the capacitance value through pseudo-capacitance effects such as redox reactions.

(c) Being deposited with transition metal oxides or sulfides, such as $RuO_2$, $TiO_2$, $MnO_2$, $Cr_2O_3$, and $Co_2O_3$, for the purpose of forming redox pairs with graphene sheets, thereby imparting pseudo-capacitance to the electrode; and (d) subjected to a chemical or physical activation treatment (analogous to activation of carbon black materials) to create additional surfaces and possibly imparting functional chemical groups to these surfaces. The activation treatment can be accomplished through $CO_2$ physical activation, KOH chemical activation, or exposure to nitric acid, fluorine, or ammonia plasma.

In the instant invention, there is no limitation on the type of liquid or gel electrolytes that can be used in the supercapacitor: aqueous, organic, gel, and ionic liquid. Typically, electrolytes for supercapacitors consist of solvent and dissolved chemicals (e.g. salts) that dissociate into positive ions (cations) and negative ions (anions), making the electrolyte electrically conductive. The more ions the electrolyte contains, the better its conductivity, which also influences the capacitance. In supercapacitors, the electrolyte provides the molecules for the separating monolayer in the Helmholtz double-layer (electric double layer) and delivers the ions for pseudocapacitance.

Water is a relatively good solvent for dissolving inorganic chemicals. When added together with acids such as sulfuric acid ($H_2SO_4$), alkalis such as potassium hydroxide (KOH), or salts such as quaternary phosphonium salts, sodium perchlorate ($NaClO_4$), lithium perchlorate ($LiClO_4$) or lithium hexafluoride arsenate ($LiAsF_6$), water offers relatively high conductivity values. Aqueous electrolytes have a dissociation voltage of 1.15 V per electrode and a relatively low operating temperature range. Water electrolyte-based supercapacitors exhibit low energy density.

Alternatively, electrolytes may contain organic solvents, such as acetonitrile, propylene carbonate, tetrahydrofuran, diethyl carbonate, γ-butyrolactone, and solutes with quaternary ammonium salts or alkyl ammonium salts such as tetraethylammonium tetrafluoroborate ($N(Et)_4BF_4$) or triethyl (methyl) tetrafluoroborate ($NMe(EO_3BF_4)$). Organic electrolytes are more expensive than aqueous electrolytes, but they have a higher dissociation voltage of typically 1.35 V per electrode (2.7 V capacitor voltage), and a higher temperature range. The lower electrical conductivity of organic solvents (10 to 60 mS/cm) leads to a lower power density, but a higher energy density since the energy density is proportional to the square of the voltage.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a supercapacitor.

In order to make a pseudo-capacitor (a supercapacitor that works on the development of pseudo-capacitance through redox pair formation), the anode active material or cathode active material may be designed to contain graphene sheets and a redox pair partner material selected from a metal oxide, a conducting polymer (e.g. conjugate-chain polymers), a non-conducting polymer (e.g. polyacrylonitrile, PAN), an organic material (e.g. hydroquinone), a non-graphene carbon material, an inorganic material, or a combination thereof. Many of the materials that can pair up with reduced graphene oxide sheets are well-known in the art. In this study, we have come to realize that graphene halogenide (e.g. graphene fluoride), graphene hydrogenide, and nitrogenated graphene can work with a wide variety of partner materials to form a redox pair for developing pseudo-capacitance.

For instance, the metal oxide or inorganic materials that serve in such a role include $RuO_2$, $IrO_2$, NiO, $MnO_2$, $VO_2$, $V_2O_5$, $V_3O_8$, $TiO_2$, $Cr_2O_3$, $Co_2O_3$, $Co_3O_4$, $PbO_2$, $Ag_2O$, $MoC_x$, $Mo_2N$, or a combination thereof. In general, the inorganic material may be selected from a metal carbide, metal nitride, metal boride, metal dichalcogenide, or a combination thereof. Preferably, the desired metal oxide or inorganic material is selected from an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, or nickel in a nanowire, nano-disc, nano-ribbon, or nano platelet form. These materials or their precursors can be incorporated in the coating slurry prior to the coating or film forming procedure. Alternatively, their molecular precursors in a liquid solution may be impregnated into the pores of the graphene foam and the precursor is then thermally or chemically converted into the desired inorganic species (e.g. transition metal oxide). The liquid or gel electrolyte is then impregnated into the foam.

The following examples are used to illustrate some specific details about the best modes of practicing the instant invention and should not be construed as limiting the scope of the invention.

Example 1: Preparation of Isolated Graphene Oxide Sheets

Chopped graphite fibers with an average diameter of 12 µm and natural graphite particles were separately used as a starting material, which was immersed in a mixture of concentrated sulfuric acid, nitric acid, and potassium permanganate (as the chemical intercalate and oxidizer) to prepare graphite intercalation compounds (GICs). The starting material was first dried in a vacuum oven for 24 h at 80° C. Then, a mixture of concentrated sulfuric acid, fuming nitric acid, and potassium permanganate (at a weight ratio of 4:1:0.05) was slowly added, under appropriate cooling and stirring, to a three-neck flask containing fiber segments. After 5-16 hours of reaction, the acid-treated graphite fibers or natural graphite particles were filtered and washed thoroughly with deionized water until the pH level of the solution reached 6. After being dried at 100° C. overnight, the resulting graphite intercalation compound (GIC) or graphite oxide fiber was re-dispersed in water and/or alcohol to form a slurry.

In one sample, five grams of the graphite oxide fibers were mixed with 2,000 ml alcohol solution consisting of alcohol and distilled water with a ratio of 15:85 to obtain a slurry mass. Then, the mixture slurry was subjected to ultrasonic irradiation with a power of 200 W for various lengths of time. After 20 minutes of sonication, GO fibers were effectively exfoliated and separated into thin graphene oxide sheets with oxygen content of approximately 23%-31% by weight. The resulting suspension contains GO sheets being suspended in water. The suspension was dried and the resulting GO sheets were thermally reduced at 300° C. for 24 hours to obtain reduced graphene oxide (RGO) sheets.

Part of the RGO sheets was mixed with NMP to form a slurry, which was then coated onto both primary surfaces of a sheet of Al foil (serving as a current collector). The maximum thickness of RGO coated on each side of Al foil was approximately 70 µm, beyond which the electrode layer has the tendency to get cracked or delaminated when NMP was removed. Two pieces of electrodes, each with Al foil coated with RGO (+5% acetylene black and 7% PVDF binder resin), spaced by a porous separator, were laminated to form a conventional supercapacitor cell. The cell was enclosed in a nylon-Al laminated housing (envelop), injected with a liquid electrolyte, and then sealed. This is a conventional symmetric EDLC graphene supercapacitor.

The remaining portion of the RGO sheets was directly dispersed in the same liquid electrolyte to form a dispersion. Part of the dispersion was compressed and consolidated into a layer of electrolyte-impregnated, compacted and highly oriented graphene sheets (electrolyte-impregnated laminar graphene structure) according to the process illustrated in FIG. 3. This was bonded to a current collector (Al foil) with the graphene sheets aligned parallel to the Al foil plane. This two-layer structure was wound into a roll shape for use in a Type-I rolled supercapacitor. Other part of the dispersion was made into a layer of electrolyte-impregnated laminar graphene structure having aligned graphene sheets, but this layer was then peeled off from the current collector. The layer of electrolyte-impregnated laminar graphene structure was wound into a roll shape for use in a Type-II rolled supercapacitor.

Example 2: Preparation of Single-Layer Graphene Sheets from Meso-Carbon Micro-Beads (MCMBs)

Meso-carbon microbeads (MCMBs) were supplied from China Steel Chemical Co., Kaohsiung, Taiwan. This material has a density of about 2.24 g/cm$^3$ with a median particle size of about 16 µm. MCMB (10 grams) were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was no less than 4.5. The slurry was then subjected ultrasonication for 10-100 minutes to produce GO suspensions. TEM and atomic force microscopic studies indicate that most of the GO sheets were single-layer graphene when the oxidation treatment exceeded 72 hours, and 2- or 3-layer graphene when the oxidation time was from 48 to 72 hours. The GO sheets were then made into supercapacitor electrodes and supercapacitor cells using both the presently invented processes (as illustrated in FIG. 3) and the conventional production process (preparation of NMP-GO slurry, coating, drying, cell lamination, and electrolyte injection).

Example 3: Preparation of Pristine Graphene (0% Oxygen)

Recognizing the possibility of the high defect population in GO sheets acting to reduce the conductivity of individual graphene plane, we decided to study if the use of pristine graphene sheets (non-oxidized and oxygen-free, non-halogenated and halogen-free, etc.) can lead to a graphene supercapacitor having a higher electrical conductivity and lower equivalent series resistance. Pristine graphene sheets were produced by using the direct ultrasonication process (also called the liquid-phase exfoliation process).

In a typical procedure, five grams of graphite flakes, ground to approximately 20 µm or less in sizes, were dispersed in 1,000 mL of deionized water (containing 0.1% by weight of a dispersing agent, Zonyl® FSO from DuPont) to obtain a suspension. An ultrasonic energy level of 85 W (Branson 5450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. There are no other non-carbon elements. The pristine graphene sheets were then made into supercapacitor electrodes and rolled supercapacitor cells using the presently invented processes (as illustrated in FIG. 3). The conventional production process (preparation of NMP-graphene slurry, coating, drying, cell lamination, and electrolyte injection) was also followed to produce. conventional (non-rolled) supercapacitors for comparison.

Example 4: Preparation of Graphene Oxide (GO) Suspension from Natural Graphite and of Subsequent GO Electrodes Graphite oxide was prepared by oxidation of graphite flakes with an oxidizer liquid consisting of sulfuric acid, sodium nitrate, and potassium permanganate at a ratio of 4:1:0.05 at 30° C. When natural graphite flakes (particle sizes of 14 µm) were immersed and dispersed in the oxidizer mixture liquid for 48 hours, the suspension or slurry appears and remains optically opaque and dark. After 48 hours, the reacting mass was rinsed with water 3 times to adjust the pH value to at least 3.0. A final amount of water was then added to prepare a series of GO-water suspensions using ultrasonication. The suspension containing 5% of GO sheets were then spray-dried to form isolated GO sheets, which was thermally reduced at 1,500° C. for 1 hour. Some of these GO sheets were then dispersed in an electrolyte to form several dispersion samples, which were then made into supercapacitor electrodes using the presently invented process (roll-pressing-based as illustrated in FIG. 3). Some were made into conventional supercapacitors using the prior art slurry coating approach.

Comparative Example 4: Graphene Foams from Hydrothermally Reduced Graphene Oxide For comparison, a self-assembled graphene hydrogel (SGH) sample was prepared by a one-step hydrothermal method. In a procedure, the SGH was prepared by heating 2 mg/mL of homogeneous graphene oxide (GO) aqueous dispersion sealed in a Teflon-lined autoclave at 180° C. for 12 h. The resulting SGH contains about 2.6% (by weight) graphene sheets and 97.4% water. Upon drying and heat treating at 1,500° C., the resulting graphene foam exhibited a high porosity level. The foam structures were subjected to mechanical compression, some before and some after electrolyte impregnation, in order to determine the suitability of SGH-based foams as a supercapacitor electrode.

We have unexpectedly discovered that the SGH-based foam structures could not be compressed to a tap density higher than 0.7 g/cm$^3$, and that those foam structures having a tap density higher than 0.4 g/cm$^3$ could not be fully impregnated by liquid electrolyte. Incomplete impregnation by liquid electrolyte also means the presence of dry spots in the electrode where no electric double layers of charges could be formed. The presently invented processes do not have these low tap density or electrolyte inaccessibility issues. The new supercapacitors are capable of delivering both high gravimetric energy density and high volumetric energy density.

It is of significance to point out that all the prior art processes for producing graphite foams or graphene foams appear to provide macro-porous foams having a physical density in the range of approximately 0.01-0.6 g/cm$^3$ and the pore sizes are typically too large (e.g. from 10 to 300 μm). In contrast, the instant invention provides processes that generate electrolyte-impregnated laminar graphene structures having a tap density that can be from 0.5 g/cm$^3$ to as high as 1.7 g/cm$^3$. The pore sizes can be varied between 0.5 nm to 10 nm with electrolyte already pre-loaded between graphene sheets (hence, no dry spots or electrolyte inaccessible pores as in prior art activated carbon or graphene-based supercapacitor electrodes). This level of flexibility and versatility in designing various types of graphene-based supercapacitor electrodes is unprecedented and un-matched by any prior art process.

Example 5: Preparation of Porous Graphene Fluoride (GF) Structures

Several processes have been used by us to produce GF, but only one process is herein described as an example. In a typical procedure, highly exfoliated graphite (HEG) was prepared from intercalated compound C$_2$F·xClF$_3$. HEG was further fluorinated by vapors of chlorine trifluoride to yield fluorinated highly exfoliated graphite (FHEG). Pre-cooled Teflon reactor was filled with 20-30 mL of liquid pre-cooled ClF$_3$, the reactor was closed and cooled to liquid nitrogen temperature. Then, no more than 1 g of HEG was put in a container with holes for ClF$_3$ gas to access and situated inside the reactor. In 7-10 days a gray-beige product with approximate formula C$_2$F was formed.

Subsequently, a small amount of FHEG (approximately 0.5 mg) was mixed with 20-30 mL of an organic solvent (methanol, ethanol, 1-propanol, 2-propanol, 1-butanol, tert-butanol, isoamyl alcohol) and subjected to an ultrasound treatment (280 W) for 30 min, leading to the formation of homogeneous yellowish dispersions. Five minutes of sonication was enough to obtain a relatively homogenous dispersion, but longer sonication lengths of time ensured better stability. Some of these GF sheets were dispersed in an electrolyte to form several dispersion samples, which were then made into supercapacitor electrodes using the presently invented process (roll-pressing-based as illustrated in FIG. 3. Some were made into conventional supercapacitors using the prior art slurry coating approach.

Example 6: Preparation of Nitrogenated Graphene-Based Supercapacitors

Graphene oxide (GO), synthesized in Example 2, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene/urea mass ratios of 1:0.5, 1:1 and 1:2, respectively and the nitrogen contents of these samples were 14.7, 18.2 and 17.5 wt %, respectively as determined by elemental analysis. These nitrogenated graphene sheets remain dispersible in water. The resulting suspensions were then added with a Na2SO4 salt and some deionized water to produce a 1M aqueous solution of Na2SO4 (as an aqueous electrolyte). The suspension was then subjected to compression and consolidation using the processes described in FIG. 3.

Example 7: Preparation of Intrinsically Conductive Polymer-Graphene Redox Pairs

In this series of examples, intrinsically conductive polymers (e.g. polyaniline, poly polypyrrole, and polythiophene) and their sulfonated versions are evaluated for their effectiveness as a redox pair partner material with a graphene material.

The chemical synthesis of the sulfonated polyaniline (S-PANi) was accomplished by reacting polyaniline with concentrated sulfuric acid. The procedure was similar to that used by Epstein, et al. (U.S. Pat. No. 5,109,070, Apr. 28, 1992). The resulting S-PANi can be represented by the following Formula 1, with R$_1$, R$_2$, R$_3$, and R$_4$ group being H, SO$_3^-$ or SO$_3$H (R$_5$=H) with the content of the latter two being varied between 30% and 75% (i.e., the degree of sulfonation varied between 30% and 75%).

(Formula 1)

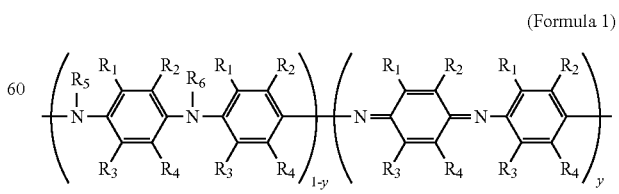

The electron conductivity of these SO$_3^-$ or SO$_3$H-based S-PANi compositions was in the range of 0.1 S/cm to 0.5

S/cm when the degree of sulfonation was from approximately 30% to 75% (with y being approximately 0.4-0.6). The S-PANi/water solution was mixed with GO/water solution at a S-PANi/GO weight ratio of ⅕-½ and, upon water removal, the S-PANi was precipitated out and coated onto the graphene sheets for forming a redox pair. The polymer-coated graphene sheets were then dispersed in electrolyte and made into pseudo-capacitance electrodes using both the presently invented process and the conventional process.

A sulfonated pyrrole-based polymer (with $X=NH$ and $Y=SO_3^-$, $m=1$, and $A=H$ in the following formula) was synthesized by following a procedure adapted from Aldissi, et al., U.S. Pat. No. 4,880,508, Nov. 14, 1989.

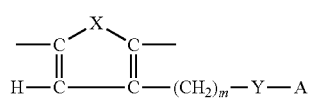
(Formula 2)

For solution impregnation, as one example, approximately 5.78 g of the resulting sulfonated polypyrrole was dissolved in 100 ml of distilled water. Then, the aqueous solution was mixed with GO/water solution and the resulting liquid mixture was dried to allow for precipitation and deposition of sulfonated polypyrrole onto surfaces of graphene sheets to form a redox pair. Conductive polymer-coated graphene sheets were then dispersed in a liquid electrolyte and made into pseudo-capacitance electrodes using both the presently invented process and the conventional process.

Water-soluble conductive polymers having a thiophene ring ($X=$sulfur) and alkyl groups containing 4 carbon atoms ($m=4$) in the above Formula 2 were prepared, according to a method adapted from Aldissi, et al. (U.S. Pat. No. 4,880, 508, Nov. 14, 1989). The surfactant molecules of these polymers were sulfonate groups with sodium. Conductivity of this polymer in a self-doped state was found to be from about $10^{-3}$ to about $10^{-2}$ S/cm.

A doped poly (alkyl thiophene) (PAT) with $Y=SO_3H$ and $A=H$ in Formula 2 that exhibited an electron conductivity of 12.5 S/cm was dissolved in an aqueous hydrogen peroxide ($H_2O_2$) solution. The resulting polymer solution was mixed with a GO/water solution and dried to form a redox pair. Conductive polymer-coated graphene sheets were then dispersed in a liquid electrolyte and made into pseudo-capacitance electrodes using both the presently invented process and the conventional process.

We have surprisingly discovered that the sulfonated conductive polymer (e.g. S-PANi), paired up with a graphene material and prepared with the presently invented compressing, consolidating and winding approach (to make rolled electrodes), leads to a significantly higher pseudo-capacitance value when compared with the corresponding material prepared by the conventional approach; e.g. 803 F/g vs. 627 F/cm³ (S-PANi); 766 F/cm³ vs. 393 F/cm³ (S-PPy); and 689 F/g vs. 354 F/g (S-PAT).

Example 8: Preparation of MnO₂-Graphene Redox Pairs

The $MnO_2$ powder was synthesized in the presence of pristine graphene. In this method, a 0.1 mol/L $KMnO_4$ aqueous solution was prepared by dissolving potassium permanganate in deionized water. Meanwhile 13.3 g surfactant of high purity sodium bis(2-ethylhexyl) sulfosuccinate was added in 300 mL iso-octane (oil) and stirred well to obtain an optically transparent solution. Then, 32.4 mL of 0.1 mol/L $KMnO_4$ solution were added in the solution, which was followed by dispersing pristine graphene sheets in the solution. The resulting suspension was ultrasonicated for 30 min and a dark brown precipitate of $MnO_2$ was coated on surfaces of graphene sheets. The products were recovered, washed several times with distilled water and ethanol, and dried at 80° C. for 12 h. The samples were $MnO_2$-coated graphene sheets, which were re-dispersed into a liquid electrolyte to form a dispersion. This graphene-electrolyte dispersion was then consolidated into an electrolyte-impregnated laminar graphene structure (FIG. 3). In such a structure, graphene and $MnO_2$ form a redox pair operating to produce pseudo-capacitance in a supercapacitor. For comparison, a corresponding supercapacitor was made using conventional slurry coating, drying, packaging, and electrolyte injection. Even with the presence of $MnO_2$ phase coated on graphene surfaces, the presently invented method is capable of closely packing and highly orienting the coated graphene sheets into an electrode of a high tap density with thin electrolyte layers inter-spaced between coated graphene sheets. The specific capacitance values of the resulting supercapacitor are 466 F/g and 595 F/cm³, which are significantly higher than the 324 F/g and 244 F/cm³ of its conventional counterpart prepared by the conventional procedures of combined slurry coating, drying, laminating, and electrolyte injection. The differences are quite dramatic and unexpected.

Example 9: Details about Evaluation of Various Supercapacitor Cells

In most of the examples investigated, both the inventive rolled supercapacitor cells and their conventional counterparts were fabricated and evaluated. The latter cells, for comparison purposes, were prepared by the conventional procedures of slurry coating of electrodes, drying of electrodes, assembling of anode layer, separator, and cathode layer, packaging of assembled laminate, and injection of liquid electrolyte. In a conventional cell, an electrode (cathode or anode), is typically composed of 85% an electrode active material (e.g. graphene, activated carbon, inorganic nano discs, etc.), 5% Super-P (acetylene black-based conductive additive), and 10% PTFE, which were mixed and coated on Al foil. The thickness of electrode is around 100 μm. For each sample, both coin-size and pouch cells were assembled in a glove box. The capacity was measured with galvanostatic experiments using an Arbin SCTS electrochemical testing instrument. Cyclic voltammetry (CV) and electrochemical impedance spectroscopy (EIS) were conducted on an electrochemical workstation (CHI 660 System, USA).

Galvanostatic charge/discharge tests were conducted on the samples to evaluate the electrochemical performance. For the galvanostatic tests, the specific capacity (q) is calculated as $$q = I * t/m \qquad (1)$$

where I is the constant current in mA, t is the time in hours, and m is the cathode active material mass in grams. With voltage V, the specific energy (E) is calculated as, $$E = \int V dq \qquad (2)$$

The specific power (P) can be calculated as $$P = (E/t)(W/kg) \qquad (3)$$

where t is the total charge or discharge step time in hours. The specific capacitance (C) of the cell is represented by the slope at each point of the voltage vs. specific capacity plot, $$C = dq/dV \qquad (4)$$

For each sample, several current density (representing charge/discharge rates) were imposed to determine the electrochemical responses, allowing for calculations of energy density and power density values required of the construction of a Ragone plot (power density vs. energy density).

Example 10: Achievable Electrode Tap Density and its Effect on Electrochemical Performance of Supercapacitor Cells The presently invented process allows us to prepare a graphene electrode of any practical tap density from 0.1 to 1.7 g/cm$^3$. It may be noted that the graphene-based supercapacitor electrodes prepared by conventional processes are limited to <0.3 g/cm$^3$, more typically <<0.2 g/cm$^3$, and most typically <<0.1 g/cm$^3$. Furthermore, as discussed earlier, only thinner electrodes can be prepared using these conventional processes. As a point of reference, the activated carbon-based electrode exhibits a tap density typically from 0.3 to 0.5 g/cm$^3$.

Figure 4:
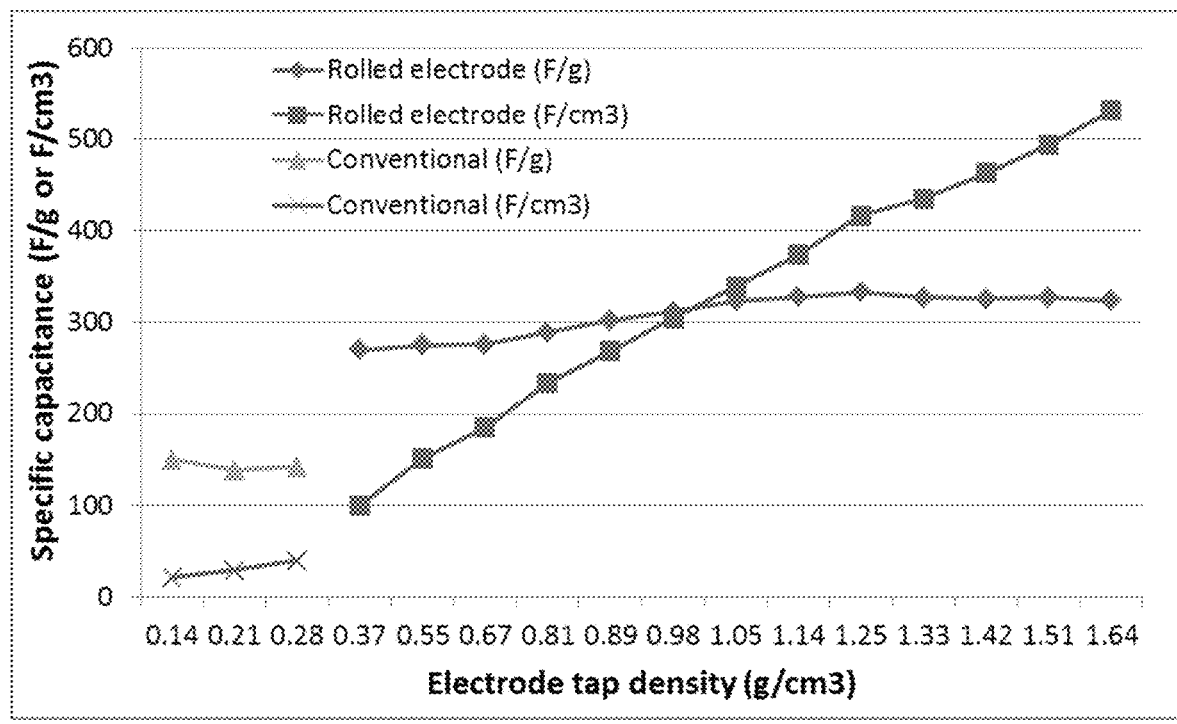
FIG. 4 The electrode specific capacitance values of two series of supercapacitors (conventional and presently invented) plotted as a function of the electrode density.

A series of EDLC electrodes with different tap densities were prepared from the same batch of electrolyte-impregnated graphene laminar structures, but roll-pressed to different extents and wound into a roll shape. The volume and weights of an electrode were measured before and after electrolyte removal and before and after roll-pressing. These measurements enabled us to estimate the tap density of the dried electrode (wet electrode volume/weight minus the amount of electrolyte actually absorbed). For comparison purposes, graphene-based electrodes of comparable thickness (70-75 μm) were also prepared using the conventional slurry coating process (the wet-dry-wet procedures). The electrode specific capacitance values of these supercapacitors using an organic electrolyte (acetonitrile) are summarized in FIG. 4. There are several significant observations that can be made from these data:
 (A) Given comparable electrode thickness, the presently invented graphene supercapacitors exhibit significantly higher gravimetric specific capacitance (270-333 F/g) as compared to those (138-150 F/g) of the corresponding graphene-based electrodes prepared by the conventional process, all based on EDLC alone.
 (B) The highest achievable tap density of the electrode prepared by the conventional method is 0.14-0.28 g/cm$^3$. In contrast, the presently invented process makes it possible to achieve a tap density of 0.35-1.64 g/cm3 (based on this series of samples alone); these unprecedented values even surpass those (0.3-0.5 g/cm$^3$) of activated carbon electrodes by a large margin.
 (C) The presently invented graphene electrodes exhibit a volumetric specific capacitance up to 531 F/cm$^3$, which is also an unprecedented value. In contrast, the graphene electrodes prepared according to the conventional method shows a specific capacitance in the range of 21-40 F/cm$^3$; the differences are dramatic.

Figure 5:
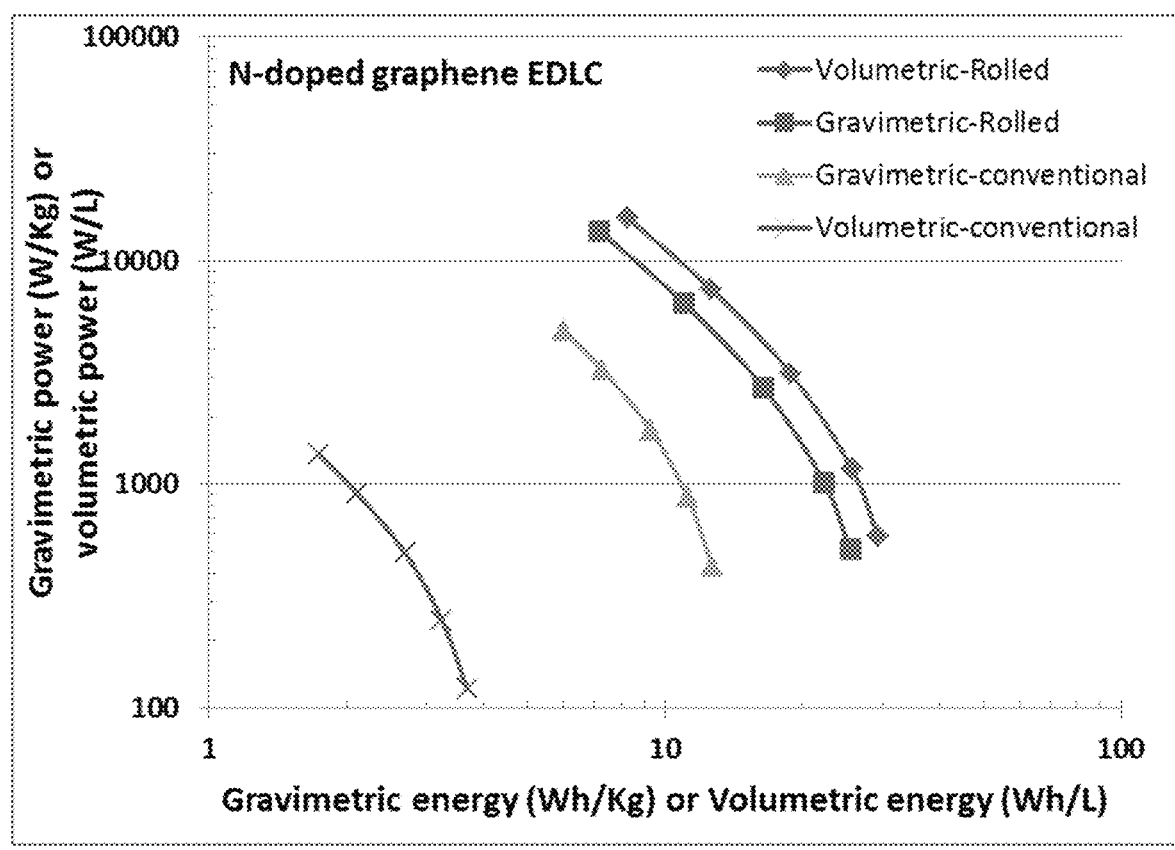
FIG. 5 Ragone plots (gravimetric and volumetric power density vs. energy density) of symmetric supercapacitor (EDLC) cells containing isolated nitrogen-doped graphene sheets or graphene foam as the electrode active material and EMIMBF4 ionic liquid electrolyte. Supercapacitors were prepared according to an embodiment of instant invention (rolled supercapacitor) and, for comparison, by the conventional slurry coating of electrodes.

Shown in FIG. 5 are Ragone plots (gravimetric and volumetric power density vs. energy density) of two sets of symmetric supercapacitor (EDLC) cells containing nitrogen-doped graphene sheets as the electrode active material and EMIMBF4 ionic liquid as the electrolyte. One of the two series of supercapacitors was based on the rolled graphene electrode prepared according to an embodiment of instant invention and the other was by the conventional slurry coating of electrodes. Several significant observations can be made from these data:
 (A) Both the gravimetric and volumetric energy densities and power densities of the supercapacitor cells prepared by the presently invented method (rolled cells) are significantly higher than those of their counterparts prepared via the conventional method (denoted as "conventional"). The differences are highly dramatic and are mainly due to the high active material mass loading (>20 mg/cm$^2$) associated with the presently invented rolled cells, reduced proportion of overhead components (non-active) relative to the active material weight/volume, no binder resin, the ability of the inventive method to more effectively pack graphene sheets together without graphene sheet re-stacking (due to pre-impregnated electrolyte serving as a spacer) and without forming any dry spots (spaces not accessible to liquid electrolyte).
 (B) For the cells prepared by the conventional method, the absolute magnitudes of the volumetric energy densities and volumetric power densities are significantly lower than those of their gravimetric energy densities and gravimetric power densities, due to the very low tap density (packing density of 0.28 g/cm$^3$) of isolated graphene sheet-based electrodes prepared by the conventional slurry coating method.
 (C) In contrast, for the cells prepared by the presently invented method, the absolute magnitudes of the volumetric energy densities and volumetric power densities are higher than those of their gravimetric energy densities and gravimetric power densities, due to the relatively high tap density (packing density of 1.2 g/cm$^3$) of graphene-based electrodes prepared by the presently invented method.

Figure 6:
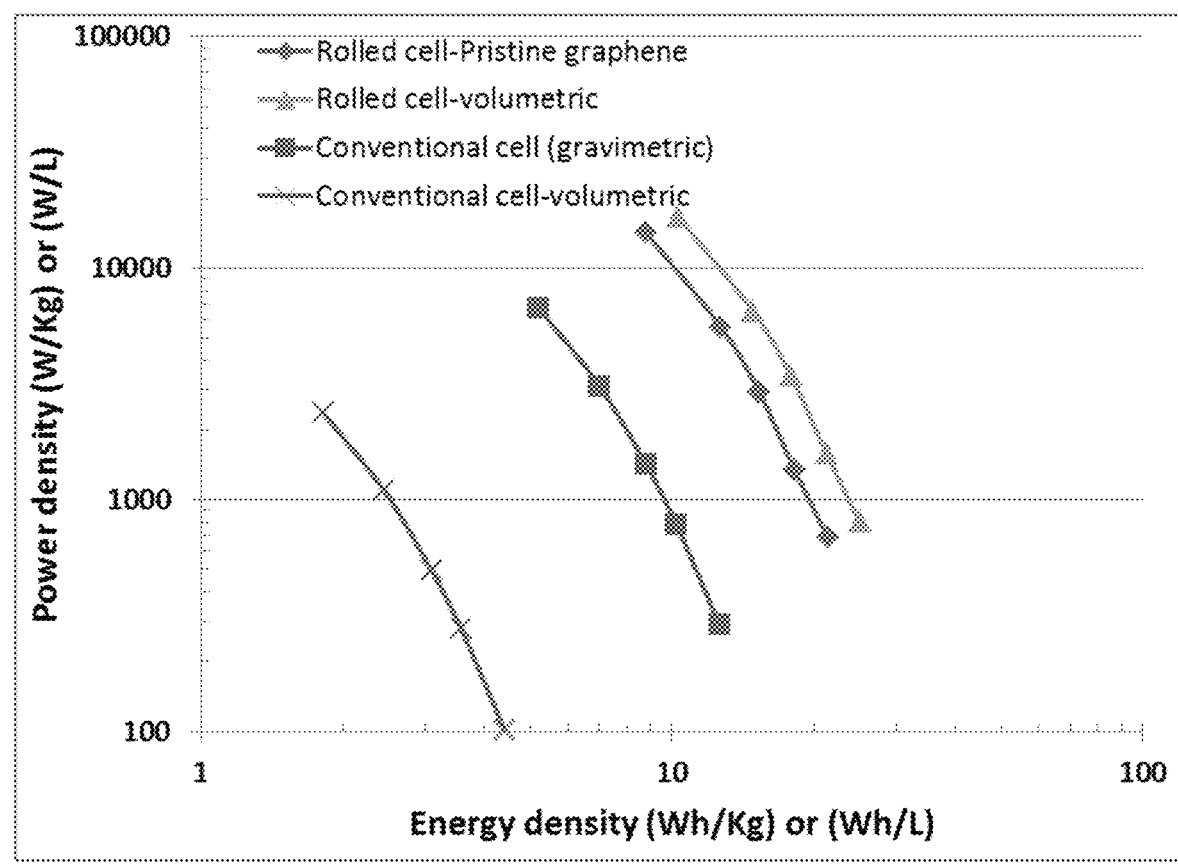
FIG. 6 Ragone plots of two pristine graphene-based EDLC supercapacitors having graphene sheets parallel and perpendicular, respectively, to the current collector surface plane.

FIG. 6 shows the Ragone plots of two pristine graphene-based EDLC supercapacitors, one being the rolled cell and the other conventional cell. The data indicate that the roll electrode having the roll width being implemented perpendicular to the current collector plane is more effective in rapidly forming electric double layers of charges as compared with the conventional electrode. Although some conventional methods (e.g. CVD) might be able to deposit graphene sheets on a current collector surface and being perpendicular thereto, these methods are incapable of forming an electrode having a high tap density and sufficiently large thickness. Although the supercapacitor containing such a CVD electrode can exhibit a high specific capacitance per active material weight, the capacitance and energy stored per unit cell weight is very low and the energy density based on cell volume is even lower. In contrast, the supercapacitor cells prepared according to an embodiment of the present invention delivers exceptional energy densities and power densities per unit cell weight and per unit cell volume (e.g. 21.4 Wh/L and 25.0 kW/L).

Figure 7:
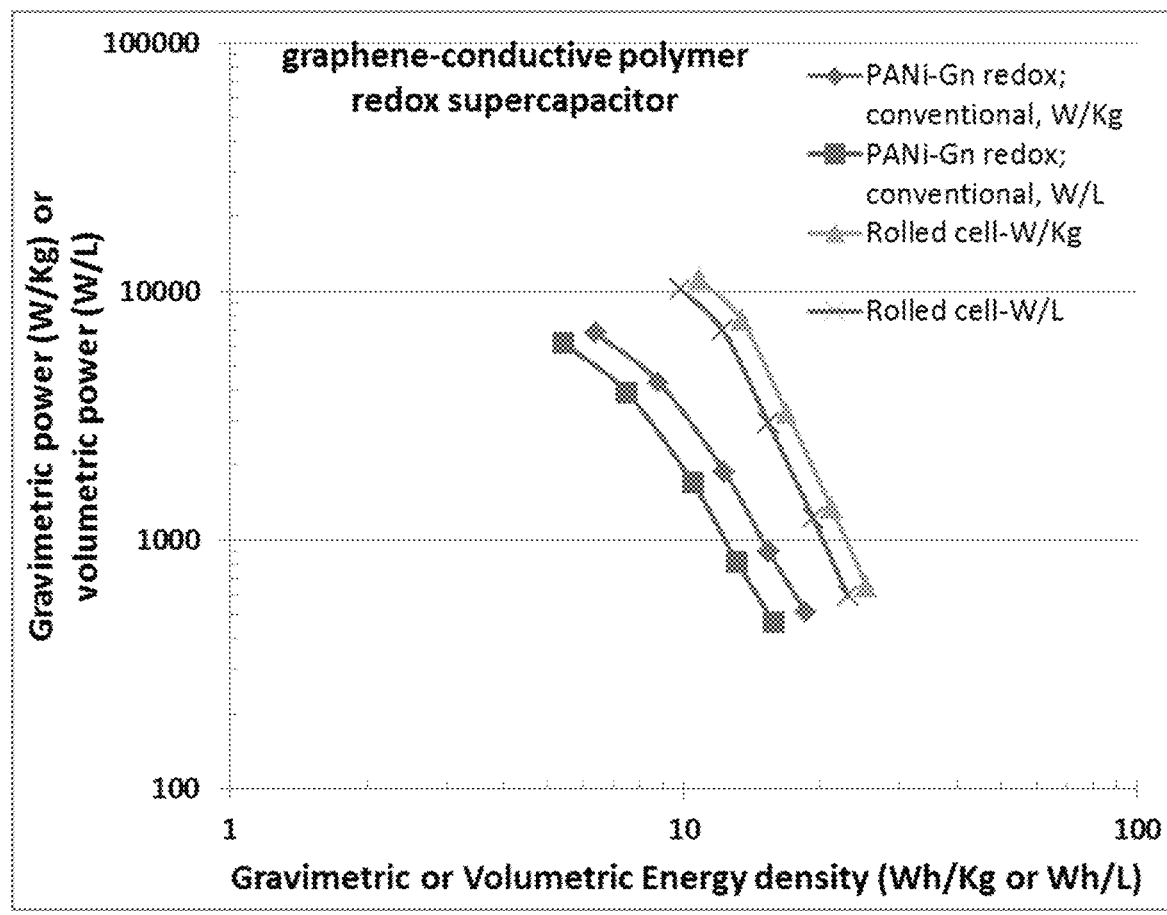
FIG. 7 Ragone plots of two graphene-conductive polymer redox supercapacitors (pseudo-capacitors) having graphene/polyaniline (PANi-Gn) as the electrode material. Both conventional supercapacitor (non-rolled) and rolled supercapacitor were investigated.

Summarized in FIG. 7 are the Ragone plots of two graphene-conductive polymer redox supercapacitors (pseudo-capacitors) having graphene-polyaniline (PANi-Gn) redox pairs-based rolled and un-rolled electrodes, respectively. Both contain Na$_2$SO$_4$ aqueous electrolyte. Again, the rolled supercapacitor exhibits a higher energy density and higher power density compared to the conventional cell.

Figure 8:
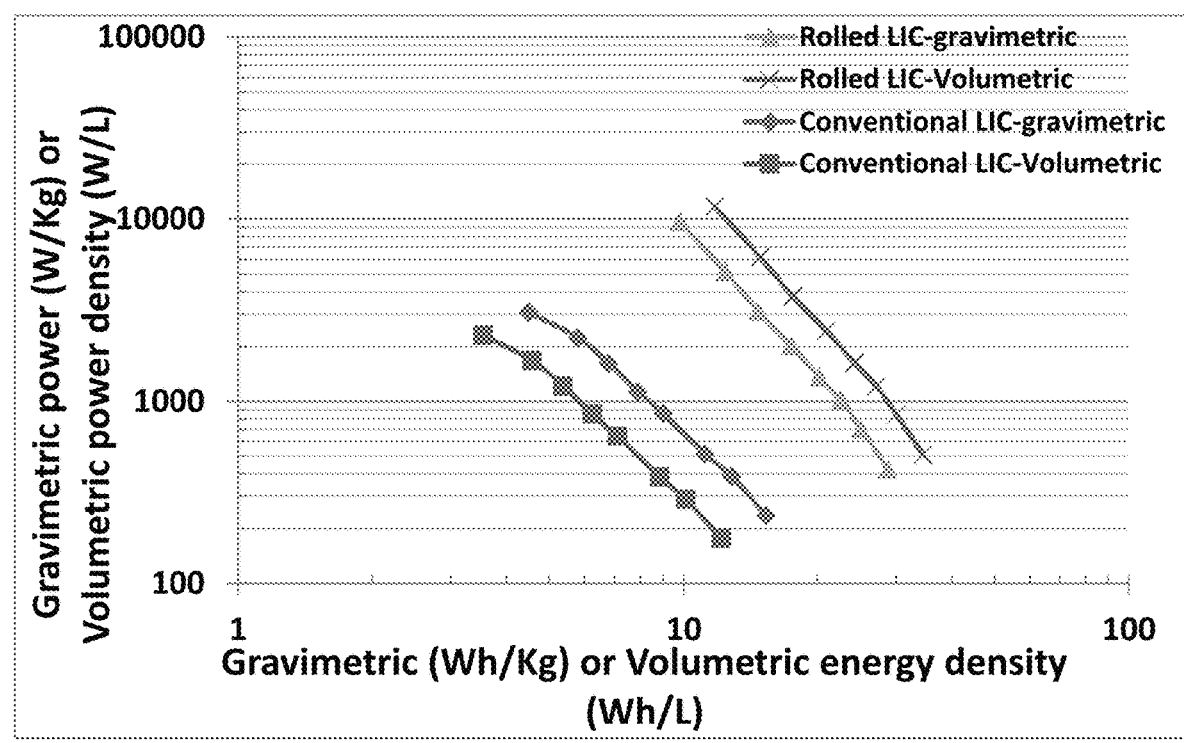
FIG. 8 Ragone plots of lithium ion capacitor (LIC) cells containing pristine graphene sheets as the electrode active material and lithium salt-PC/DEC organic liquid electrolyte. Supercapacitors were prepared according to an embodiment of instant invention and by the conventional slurry coating of electrodes.

Shown in FIG. 8 are Ragone plots of lithium ion capacitor (LIC) cells containing pristine graphene sheets as the cathode active material, prelithiated graphite particles as the anode active material, and lithium salt ($LiPF_6$)—PC/DEC as organic liquid electrolyte. The data are for both LICs, wherein the cathode is prepared by the presently invented electrolyte-graphene compressing and consolidating method (rolled cell) and those by the conventional slurry coating of electrodes. These data indicate that both the gravimetric and volumetric energy densities and power densities of the rolled LIC cells are significantly higher than those of their counterparts prepared via the conventional method. Again, the differences are huge and are mainly ascribed to the high active material mass loading (>25 mg/cm$^2$ at the cathode side) associated with the presently invented rolled cells, reduced proportion of overhead (non-active) components relative to the active material weight/volume, no binder resin, the ability of the inventive method to more effectively pack graphene sheets together without graphene re-stacking and without electrolyte-deficient dry spots.

For the LIC cells prepared by the conventional method, the absolute magnitudes of the volumetric energy densities and volumetric power densities are significantly lower than those of their gravimetric energy densities and gravimetric power densities, due to the very low tap density (packing density of 0.28 g/cm$^3$) of the graphene-based cathodes prepared by the conventional slurry coating method. In contrast, for the LIC cells prepared by the instant method, the absolute magnitudes of the volumetric energy densities and volumetric power densities are higher than those of their gravimetric energy densities and gravimetric power densities, due to the relatively high tap density of the graphene-based cathodes prepared by the presently invented method.

It is of significance to point out that reporting the energy and power densities per unit of active material weight alone on a Ragone plot, as did by many researchers, may not give a realistic picture of the performance of the assembled supercapacitor cell. The weights of other device components also must be taken into account. These overhead components, including current collectors, electrolyte, separator, binder, connectors, and packaging, are non-active materials and do not contribute to the charge storage amounts. They only add weights and volumes to the device. Hence, it is desirable to reduce the relative proportion of overhead component weights and increase the active material proportion. However, it has not been possible to achieve this objective using conventional supercapacitor production processes. The present invention overcomes this long-standing, most serious problem in the art of supercapacitors.

In a commercial supercapacitor having an electrode thickness of 150 µm, the weight of the active material (i.e. activated carbon) accounts for about 30% of the total mass of the packaged cell. Hence, a factor of 3 to 4 is frequently used to extrapolate the energy or power densities of the device (cell) from the properties based on the active material weight alone. In most of the scientific papers, the properties reported are typically based on the active material weight alone and the electrodes are typically very thin (<<100 µm, and mostly <<50 µm). The active material weight is typically from 5% to 10% of the total device weight, which implies that the actual cell (device) energy or power densities may be obtained by dividing the corresponding active material weight-based values by a factor of 10 to 20. After this factor is taken into account, the properties reported in these papers do not really look any better than those of commercial supercapacitors. Thus, one must be very careful when it comes to read and interpret the performance data of supercapacitors reported in the scientific papers and patent applications.

One might be tempted to think the electrode thickness of a supercapacitor is a design parameter that can be freely adjusted for optimization of device performance; but, in reality, the supercapacitor thickness is manufacturing-limited and one cannot produce electrodes of good structural integrity that exceed certain thickness level. Our studies further indicate that this problem is even more severe with graphene-based electrode. The instant invention solves this critically important issue associated with supercapacitors.

The presently invented process allows us to prepare graphene-based rolled electrode having a large roll width (being perpendicular to the separator plane and, hence, is equivalent to the electrode thickness of the conventional cell), typically from µm to cm (or even thicker). There is no limitation on the roll width. However, for practical purposes, we typically prepare graphene electrode rolls with a roll width from 300 µm to several cm. By contrast, the conventional wet-dry-wet process does not allow for the production of graphene electrodes thicker than 200 µm.

Example 11: Achievable Active Material Weight Percentage in a Cell and its Effect on Electrochemical Performance of Supercapacitor Cells Because the active material weight accounts for up to about 30% of the total mass of the packaged commercial supercapacitors, a factor of 30% must be used to extrapolate the energy or power densities of the device from the performance data of the active material alone. Thus, the energy density of 20 Wh/kg of activated carbon (i.e. based on the active material weight alone) will translate to about 6 Wh/kg of the packaged cell. However, this extrapolation is only valid for electrodes with thicknesses and densities similar to those of commercial electrodes (150 µm or up to about 10 mg/cm$^2$ of the carbon electrode). An electrode of the same active material that is thinner or lighter will mean an even lower energy or power density based on the total cell weight. Thus, it would be desirable to produce a supercapacitor cell having a high active material proportion. Unfortunately, it has not been previously possible to achieve an active material proportion greater than 40% by weight for activated carbon-based supercapacitors or greater than 20% by weight for graphene-based supercapacitors.

Figure 9:
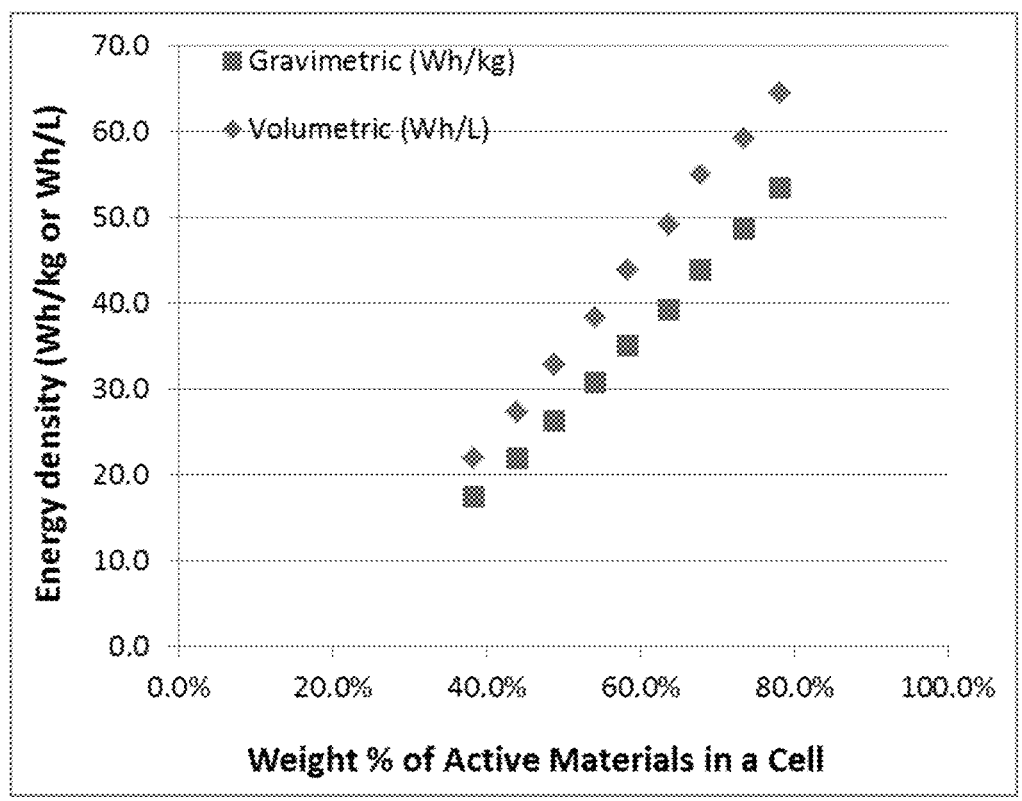
FIG. 9 The cell-level gravimetric energy densities plotted over the achievable active material proportion (active material weight/total cell weight) in a supercapacitor cell.

The presently invented rolled cell strategy enables the supercapacitors to go well beyond these limits for all active materials investigated. As a matter of fact, the instant invention makes it possible to elevate the active material proportion above 90% if so desired; but typically from 20% to 85%, more typically from 30% to 80%, even more typically from 40% to 75%, and most typically from 50% to 75%. For instance, FIG. 9 shows the cell-level gravimetric energy densities plotted over the achievable active material proportion (active material weight/total cell weight) in a graphene-based EDLC supercapacitor (with organic liquid electrolyte). Exceptional cell-level energy densities of 53.4 Wh/kg and 64.5 Wh/L have been achieved, which are the highest values ever reported for all EDLC supercapacitors (not just graphene-based).

In conclusion, we have successfully developed an absolutely new, novel, unexpected, and patently distinct class of supercapacitors having rolled electrodes containing highly conducting and oriented graphene sheets that are aligned in a favorable direction conducive to ion transport and electric double layer formation. These electrodes, containing closely packed and highly oriented graphene sheets interspaced with electrolyte and having the roll width being perpendicular to the separator plane, lead to rolled supercapacitors exhibiting surprisingly and unprecedentedly high energy densities and power densities based on per unit of cell weight or cell volume.

We claim:

1. A rolled supercapacitor comprising an anode, a cathode, a porous separator electronically separating said anode and said cathode, and an electrolyte in ionic contact with said anode and said cathode, wherein said anode contains a wound anode roll of an anode active material having an anode roll length, an anode roll width, and an anode roll thickness, wherein said anode active material contains isolated graphene sheets that are oriented substantially parallel to a plane defined by said anode roll length and said anode roll width; and/or said cathode contains a wound cathode roll of a cathode active material having a cathode roll length, a cathode roll width, and a cathode roll thickness, wherein said cathode active material contains isolated graphene sheets that are oriented substantially parallel to a plane defined by said cathode roll length and said cathode roll width; and wherein said anode roll width and/or said cathode roll width is substantially perpendicular to said separator and wherein the electrolyte and the isolated graphene sheets in the anode or the cathode are assembled into an electrolyte-impregnated laminar graphene structure that is wound into an anode roll or a cathode roll, wherein the isolated graphene sheets are alternately spaced by and pre-wetted with thin electrolyte layers, having a thickness from 0.4 nm to 10 nm, and the laminar graphene structure has a physical density from 0.5 to 1.7 $g/cm^3$ and a specific surface area from 50 to 3,300 $m^2/g$, when measured in a dried state of the laminar structure with said electrolyte removed, wherein there are no dry spots in said anode and/or said cathode.

2. The rolled supercapacitor of claim 1, wherein said isolated graphene sheets are selected from a pristine graphene or a non-pristine graphene material, having a content of non-carbon elements greater than 2% by weight, selected from graphene fluoride, graphene chloride, graphene bromide, graphene iodide, hydrogenated graphene, nitrogenated graphene, chemically functionalized graphene, doped graphene, or a combination thereof.

3. The rolled supercapacitor of claim 1, wherein said isolated graphene sheets are attached to or coupled with a nano-scaled coating or particles of a redox pair partner selected from an intrinsically conductive polymer, a transition metal oxide, and/or an organic molecule, wherein said redox pair partner and said graphene sheets form a redox pair for pseudo-capacitance.

4. The rolled supercapacitor of claim 3, wherein said intrinsically conducting polymer is selected from polyaniline, polypyrrole, polythiophene, polyfuran, sulfonated polyaniline, sulfonated polypyrrole, sulfonated polythiophene, sulfonated polyfuran, sulfonated polyacetylene, or a combination thereof.

5. The rolled supercapacitor of claim 1, further containing an anode tab connected to or integral with said anode and a cathode tab connected to or integral with said cathode.

6. The rolled supercapacitor of claim 1, further comprising a casing that encloses said anode, said cathode, said separator, and said electrolyte therein to form a sealed battery.

7. The rolled supercapacitor of claim 1, wherein said wound anode roll of an anode active material contains (a) a layer of supporting solid substrate having two primary surfaces wherein either one or both of said primary surfaces are coated with said anode active material, an optional conductive additive, and an optional binder or (b) a layer of supporting porous substrate having pores that are impregnated with said anode active material, an optional conductive additive, and an optional binder.

8. The rolled supercapacitor of claim 1, wherein said wound cathode roll of a cathode active material contains (a) a layer of supporting solid substrate having two primary surfaces wherein either one or both of said primary surfaces are coated with said cathode active material, an optional conductive additive, and an optional binder or (b) a layer of supporting porous substrate having pores that are impregnated with said cathode active material, an optional conductive additive, and an optional binder.

9. The rolled supercapacitor of claim 1, wherein said electrolyte and said isolated graphene sheets in said anode or said cathode are assembled into an electrolyte-impregnated laminar graphene structure that is wound into said anode roll or said cathode roll, wherein said isolated graphene sheets are alternately spaced by thin electrolyte layers, having a thickness from 0.4 nm to 10 nm, and said laminar graphene structure has a physical density from 0.5 to 1.7 $g/cm^3$ and a specific surface area from 50 to 3,300 $m^2/g$, when measured in a dried state of said laminar structure with said electrolyte removed.

10. The rolled supercapacitor of claim 1, wherein said liquid electrolyte contains an aqueous electrolyte, an organic electrolyte, an ionic liquid electrolyte, or a mixture of an organic and an ionic electrolyte.

11. A rolled supercapacitor comprising an anode current collector, an anode, a cathode, a cathode current collector, an ion-permeable separator that electronically separates said anode and said cathode, and an electrolyte in ionic contact with said anode and said cathode, wherein the anode and/or the cathode contains a wound roll of an electrolyte-impregnated laminar graphene structure, which is composed of multiple graphene sheets being alternately spaced by and pre-wetted with thin electrolyte layers, less than 5 nm in thickness, and said multiple graphene sheets are substantially aligned along a desired direction perpendicular to said separator, wherein there are no dry spots in said anode and/or said cathode, wherein said multiple graphene sheets are selected from a pristine graphene or a non-pristine graphene material, said non-pristine graphene material having a content of non-carbon elements greater than 2% by weight, selected from graphene fluoride, graphene chloride, graphene bromide, graphene iodide, hydrogenated graphene, nitrogenated graphene, chemically functionalized graphene, doped graphene, or a combination thereof; and wherein said laminar graphene structure has a physical density from 0.5 to 1.7 $g/cm^3$ and a specific surface area from 50 to 3,300 $m^2/g$, when measured in a dried state of said laminar graphene structure with said electrolyte removed.

12. A supercapacitor electrode roll, having a roll length, roll width, and roll thickness and containing an electrolyte-impregnated laminar graphene structure, which is composed of multiple graphene sheets being alternately spaced by and pre-wetted with thin electrolyte layers, from 0.3 nm to 10 nm in thickness, wherein multiple graphene sheets are substantially aligned along a desired direction parallel to said roll length and roll width and perpendicular to said roll thickness, wherein there are no dry spots in said supercapacitor electrode roll, and wherein said laminar graphene structure has a physical density from 0.5 to 1.7 $g/cm^3$ and a specific surface area from 50 to 3,300 $m^2/g$, when measured in a dried state of said laminar graphene structure with said electrolyte removed.

13. The rolled supercapacitor of claim 1, which is a lithium-ion capacitor or sodium-ion capacitor, wherein said cathode contains said wound cathode roll of a cathode active material having isolated graphene sheets that are oriented substantially parallel to the plane defined by said cathode roll length and said cathode roll width; and said anode contains a pre-lithiated anode active material or a pre-sodiated anode active material.

14. The rolled supercapacitor of claim 13, wherein said anode contains a roll of a layer or two layers of a pre-lithiated anode active material or pre-sodiated anode active material layer coated on a solid or porous supporting substrate.

15. The rolled supercapacitor of claim 11, which is a lithium-ion capacitor or sodium-ion capacitor, wherein said cathode contains said wound cathode roll of a cathode active material having isolated graphene sheets that are oriented substantially parallel to the plane defined by said cathode roll length and said cathode roll width; and said anode contains a pre-lithiated anode active material or a pre-sodiated anode active material.

16. The rolled supercapacitor of claim 15, wherein said anode contains a roll of a layer or two layers of a pre-lithiated anode active material or pre-sodiated anode active material layer coated on a solid or porous supporting substrate.

17. A supercapacitor that contains a plurality of the rolled supercapacitors of claim 1 that are internally connected in series.

18. A supercapacitor that contains a plurality of the rolled supercapacitors of claim 1 that are internally connected in parallel.

19. A process for producing the rolled supercapacitor of claim 1, said process comprising:
   (A) preparing an anode roll by rolling or winding a layer of solid or porous supporting substrate coated or impregnated with an anode active material, an optional conductive additive, and an optional binder into a roll shape:
   (B) preparing a cathode roll by rolling or winding a layer of solid or porous supporting substrate coated or impregnated with a cathode active material, an optional conductive additive, and an optional binder into a roll shape; wherein at least said anode roll or said cathode roll contains isolated graphene sheets that are oriented perpendicular to said anode roll thickness or cathode roll thickness;
   (C) aligning and packing the anode roll, the cathode roll, and an ion-conducting separator layer between the anode roll and the cathode roll to form a supercapacitor assembly in such a manner that the anode roll width and/or the cathode roll width direction is substantially perpendicular to the separator plane; and
   (D) impregnating an electrolyte into the battery assembly before or after the supercapacitor assembly is inserted into a protective casing to form the rolled supercapacitor.

20. The process of claim 19, wherein porous supporting substrate contains an electrically conductive porous layer selected from metal foam, metal web or screen, perforated metal sheet-based structure, metal fiber mat, metal nanowire mat, conductive polymer nano-fiber mat, conductive polymer foam, conductive polymer foam, conductive polymer-coated fiber foam, carbon foam, graphite foam, carbon aerogel, carbon xerogel, graphene foam, graphene oxide foam, reduced graphene oxide foam, carbon fiber foam, graphite fiber foam, exfoliated graphite foam, or a combination thereof.

21. A process for producing the rolled supercapacitor of claim 1, said process comprising:
   (a) preparing an anode containing an anode active material, an optional conductive additive, and an optional binder;
   (b) preparing a cathode roll by rolling or winding a layer of solid or porous supporting substrate coated or impregnated with a cathode active material, an optional conductive additive, and an optional binder into a roll shape, wherein said cathode active material contains isolated graphene sheets that are orientated substantially parallel to the plane defined by said cathode roll length and said cathode roll width;
   (c) aligning and packing the anode, the cathode roll, and an ion-conducting separator layer between the anode and the cathode roll to form a supercapacitor assembly in such a manner that the cathode roll width direction in substantially perpendicular to the separator plane; and
   (d) impregnating an electrolyte into the supercapacitor assembly before or after the supercapacitor assembly is inserted into a protective casing to form the rolled supercapacitor.

22. A process for producing the rolled supercapacitor of claim 1, said process comprising:
   (a) preparing an anode roll by winding a layer of electrolyte-impregnated laminar graphene structure into a roll shape having an anode roll length, anode roll width, and anode roll thickness, wherein said electrolyte-impregnated laminar graphene structure is composed of multiple graphene sheets being alternately spaced by thin electrolyte layers, from 0.3 nm to 10 nm in thickness, wherein multiple graphene sheets are substantially aligned along a desired direction parallel to said anode roll length and anode roll width and perpendicular to said anode roll thickness, and wherein said laminar graphene structure has a physical density of 0.5 to 1.7 g/cm$^3$ and a specific surface area of 50 to 3,300 m$^2$/g, when measured in a dried state of said laminar graphene structure with said electrolyte removed; (b) preparing a cathode roll by winding a layer of electrolyte-impregnated laminar graphene structure into a roll shape having a cathode roll length, cathode roll width, and cathode roll thickness, wherein said electrolyte-impregnated laminar graphene structure is composed of multiple graphene sheets being alternately spaced by thin electrolyte layers, from 0.3 nm to 10 10 nm in thickness, wherein multiple graphene sheets are substantially aligned along a desired direction parallel to said cathode roll length and cathode roll width and perpendicular to said cathode roll thickness; (c) aligning the anode roll, the cathode roll, and an ion-conducting separator between the anode roll and the cathode roll together to form a supercapacitor assembly in such a manner that the anode roll width and/or cathode roll width direction is substantially perpendicular to the separator plane; and (d) sealing the supercapacitor assembly in a protective casing to form said rolled supercapacitor.

23. The process of claim 22, wherein said layer of electrolyte-impregnated laminar graphene structure in said anode roll or said cathode roll is prepared by procedure comprising;

(A) preparing a graphene dispersion having multiple isolated graphene sheets dispersed in a liquid or gel electrolyte;

(B) subjecting said graphene dispersion to a forced assembly procedure, forcing said multiple graphene sheets and said electrolyte to assemble into a layer of said electrolyte-impregnated laminar graphene structure having a layer plane and a layer thickness, wherein said multiple graphene sheets are alternately spaced by thin electrolyte layers, having a thickness from 0.4 nm to 10 nm, and said multiple graphene sheets are substantially aligned along a desired direction parallel to said layer plane and perpendicular to said layer thickness direction, and wherein said laminar graphene structure has a physical density from 0.5 to 1.7 g/cm$^3$ and a specific surface area from 50 to 3,300 m$^2$/g, when measured in a dried state of said laminar structure with said electrolyte removed; and (C) winding said layer of electrolyte-impregnated laminar graphene structure into a roll shape.

24. The process of claim 23, wherein said forced assembly procedure includes introducing a first layer of said graphene dispersion onto a surface of a supporting conveyor and driving said layer of graphene suspension supported on said conveyor through at least a pair of pressing rollers to reduce a thickness of said graphene dispersion layer and align said multiple graphene sheets along a direction parallel to said conveyor surface for forming a layer of electrolyte-impregnated laminar graphene structure.

25. The process of claim 24, further including a step of introducing a second layer of said graphene dispersion onto a surface of said layer of electrolyte-impregnated laminar graphene structure to form a two layer laminar structure, and driving said two-layer laminar structure through at least a pair of pressing rollers to reduce thickness of said second layer of graphene dispersion and align said multiple graphene sheets along a direction parallel to said conveyor surface for forming a layer of electrolyte-impregnated laminar graphene structure.

26. The process of claim 24, further including a step of compressing or roll-pressing said electrolyte-impregnated laminar structure to reduce a thin electrolyte layer thickness in said impregnated laminar structure, improve orientation of graphene sheets and squeeze excess electrolyte out of said impregnated laminar graphene structure for forming said supercapacitor electrode.

27. The process of claim 24, which is roll-to-roll process wherein said forced assembly procedure includes feeding said supporting conveyor, in a continuous film form, from a feeder roller to a deposition zone, continuously or intermittently depositing said graphene dispersion onto a surface of said supporting conveyor film to form said layer of graphene dispersion thereon, and collecting said layer of electrolyte-impregnated laminar graphene structure supported on conveyor film on a collector roller.

28. The process of claim 24, further comprising a step of cutting a slitting said electrolyte-impregnated laminar graphene structure into multiple sheets of desired dimensions prior to being would into multiple rolls.

29. The process of claim 24, further comprising a step of attaching said electrolyte-impregnated laminar graphene structure to a current collector, wherein said graphene sheets are aligned parallel to a primary surface of said current collector.

30. The process of claim 23, wherein said graphene dispersion contains a graphene oxide dispersion prepared by immersing a graphitic material in a powder or fibrous form in an oxidizing liquid in a reaction vessel at a reaction temperature for a length of time sufficient to obtain said graphene dispersion wherein said graphitic material is selected from natural graphite, artificial graphite, meso-phase carbon, meso-phase pitch, meso-carbon micro-bead, soft carbon, hard carbon, coke, carbon fiber carbon nano-fiber, carbon nano-tube, or a combination thereof and wherein said graphene oxide has an oxygen content no less that 5% by weight.

* * * * *